(12) United States Patent
DesJardien et al.

(10) Patent No.: US 9,708,079 B2
(45) Date of Patent: Jul. 18, 2017

(54) MOBILE AUTOMATED OVERHEAD ASSEMBLY TOOL FOR AIRCRAFT STRUCTURES

(71) Applicant: The Boeing Company, Chicago, IL (US)

(72) Inventors: Matthew Ray DesJardien, Kenmore, WA (US); Eric M. Reid, Kenmore, WA (US); Steven A. Best, Marysville, WA (US); Daniel Saeil Martin, Stanwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/558,899

(22) Filed: Dec. 3, 2014

(65) Prior Publication Data

US 2015/0314890 A1 Nov. 5, 2015

Related U.S. Application Data

(60) Provisional application No. 61/986,807, filed on Apr. 30, 2014.

(51) Int. Cl.
*B64F 5/10* (2017.01)
*B66C 5/02* (2006.01)
(Continued)

(52) U.S. Cl.
CPC ............... *B64F 5/10* (2017.01); *B25J 5/007* (2013.01); *B25J 9/0018* (2013.01); *B25J 9/026* (2013.01); *B25J 11/007* (2013.01); *B25J 15/0491* (2013.01); *B66C 5/02* (2013.01); *B66C 19/005* (2013.01); *Y10T 29/49622* (2015.01)

(58) Field of Classification Search
CPC ........ B64F 5/0009; B64F 5/0036; B66C 5/02; B66C 19/005; Y10T 29/49622; B54F 5/10
See application file for complete search history.

(56) References Cited

U.S. PATENT DOCUMENTS

| 4,006,650 A | 2/1977 | Elmer |
|---|---|---|
| 4,108,566 A | 8/1978 | Jones |

(Continued)

FOREIGN PATENT DOCUMENTS

| AN | GB 2329138 A | * | 3/1999 | ........... B23Q 1/5462 |
|---|---|---|---|---|
| CA | 2497249 A1 | * | 8/2006 | ................ B25J 5/02 |

(Continued)

OTHER PUBLICATIONS

Extended European Search Report, dated Sep. 22, 2015, regarding Application No. EP14196571.5, 8 pages.

(Continued)

*Primary Examiner* — Eret McNichols
(74) *Attorney, Agent, or Firm* — Yee & Associates, P.C.

(57) ABSTRACT

A method and apparatus for performing an operation on a work surface of a structure. The apparatus may comprise a motion platform and an overhead support system. The motion platform may be configured to be positioned above the work surface of the structure to perform the operation on the work surface. The overhead support system may be configured to carry the motion platform across a floor of a manufacturing environment from a first location to a second location.

45 Claims, 27 Drawing Sheets

(51) Int. Cl.
- *B66C 19/00* (2006.01)
- *B25J 5/00* (2006.01)
- *B25J 9/00* (2006.01)
- *B25J 9/02* (2006.01)
- *B25J 15/04* (2006.01)
- *B25J 11/00* (2006.01)

(56) References Cited

U.S. PATENT DOCUMENTS

| | | |
|---|---|---|
| 4,148,401 A | 4/1979 | Kautetzky |
| 4,445,588 A * | 5/1984 | Truninger ............... B66C 23/62 180/233 |
| 4,477,216 A | 10/1984 | Van De Motter et al. |
| 4,483,080 A | 11/1984 | Knoll |
| 4,599,018 A | 7/1986 | Woods |
| 4,674,949 A | 6/1987 | Kroczynski |
| 4,710,086 A | 12/1987 | Naaktgeboren et al. |
| 4,781,517 A * | 11/1988 | Pearce ................... B23P 19/04 104/167 |
| 4,850,763 A | 7/1989 | Jack et al. |
| 4,940,382 A | 7/1990 | Castelain et al. |
| 5,022,542 A * | 6/1991 | Beier ........................ B66C 5/02 104/126 |
| 5,150,506 A * | 9/1992 | Kotake .................. B62D 65/02 29/407.05 |
| 5,326,201 A | 7/1994 | King |
| 5,351,626 A | 10/1994 | Yanagisawa |
| 5,390,128 A * | 2/1995 | Ryan ................. G05B 19/4083 318/568.23 |
| 5,407,415 A | 4/1995 | Spishak |
| 5,468,099 A | 11/1995 | Wheetley et al. |
| 5,526,203 A | 6/1996 | Mohajerani et al. |
| 5,564,655 A | 10/1996 | Garland et al. |
| 5,646,870 A | 7/1997 | Krivokapic et al. |
| 5,653,351 A * | 8/1997 | Grout ...................... B66C 19/00 212/315 |
| 5,709,026 A | 1/1998 | Veselaski et al. |
| 5,715,729 A * | 2/1998 | Toyama ............... B23Q 1/5462 408/234 |
| 5,761,064 A | 6/1998 | La et al. |
| 5,822,877 A | 10/1998 | Dai |
| 5,920,394 A | 7/1999 | Gelbart et al. |
| 6,098,260 A | 8/2000 | Sarh |
| 6,230,382 B1 | 5/2001 | Cunningham et al. |
| 6,779,272 B2 | 8/2004 | Day et al. |
| 6,843,328 B2 | 1/2005 | Boyl-Davis et al. |
| 6,862,912 B2 | 3/2005 | Olsson |
| 6,871,524 B2 | 3/2005 | Olsson |
| 6,926,094 B2 | 8/2005 | Arntson et al. |
| 6,961,626 B1 | 11/2005 | Paik |
| 7,168,898 B2 * | 1/2007 | Hamann ................ B23Q 1/035 269/21 |
| 7,249,943 B2 * | 7/2007 | Benson ................ B29C 70/388 425/374 |
| 7,273,333 B2 | 9/2007 | Buttrick et al. |
| 7,406,758 B2 | 8/2008 | Jones et al. |
| 7,614,154 B2 | 11/2009 | Cobb |
| 8,005,563 B2 | 8/2011 | Cobb et al. |
| 8,299,118 B2 | 10/2012 | Chang et al. |
| 8,539,658 B2 | 9/2013 | Munk |
| 8,606,388 B2 | 12/2013 | Cobb et al. |
| 8,620,470 B2 | 12/2013 | Cobb et al. |
| 8,661,684 B1 | 3/2014 | Boyd et al. |
| 8,763,953 B2 | 7/2014 | Sakurai et al. |
| 8,790,050 B2 | 7/2014 | Marguet et al. |
| 9,090,357 B2 * | 7/2015 | Oberoi ................... B64F 5/0009 |
| 9,205,933 B2 * | 12/2015 | Oberoi ................... B64F 5/0009 |
| 9,299,118 B1 | 3/2016 | McGraw |
| 2002/0066192 A1 | 6/2002 | Cunningham et al. |
| 2003/0043964 A1 | 3/2003 | Sorenson |
| 2003/0097198 A1 | 5/2003 | Sonderman et al. |
| 2003/0149502 A1 | 8/2003 | Rebello et al. |
| 2004/0039465 A1 | 2/2004 | Boyer et al. |
| 2005/0036879 A1 * | 2/2005 | Jhaveri ................... B25J 9/0084 414/751.1 |
| 2005/0049126 A1 | 3/2005 | Everson et al. |
| 2005/0172470 A1 | 8/2005 | Cobb et al. |
| 2005/0223549 A1 | 10/2005 | Braun |
| 2006/0108470 A1 | 5/2006 | McCrary et al. |
| 2007/0029877 A1 | 2/2007 | Longley |
| 2007/0180674 A1 | 8/2007 | Morden et al. |
| 2008/0077276 A1 | 3/2008 | Sanjuan et al. |
| 2008/0155807 A1 | 7/2008 | Toh et al. |
| 2008/0205763 A1 | 8/2008 | Marsh et al. |
| 2009/0112349 A1 | 4/2009 | Cobb et al. |
| 2010/0025349 A1 * | 2/2010 | Khoshnevis ............ B05B 13/04 212/324 |
| 2010/0151364 A1 | 6/2010 | Ye et al. |
| 2010/0180711 A1 * | 7/2010 | Kilibarda .............. B05B 15/0225 74/490.06 |
| 2010/0204817 A1 | 8/2010 | Fujita |
| 2010/0217437 A1 | 8/2010 | Sarh et al. |
| 2011/0010007 A1 | 1/2011 | Sarh et al. |
| 2011/0054694 A1 | 3/2011 | Munk |
| 2011/0132548 A1 * | 6/2011 | De Mattia ............. B29C 70/386 156/577 |
| 2011/0178727 A1 | 7/2011 | Hafenrichter et al. |
| 2011/0214586 A1 | 9/2011 | Wessel et al. |
| 2012/0014759 A1 | 1/2012 | Sarh et al. |
| 2012/0210802 A1 | 8/2012 | Sarh et al. |
| 2013/0014368 A1 | 1/2013 | Woods et al. |
| 2013/0018525 A1 | 1/2013 | Jang et al. |
| 2013/0145850 A1 * | 6/2013 | Lute, Jr. ................. G01N 29/043 73/619 |
| 2013/0152397 A1 * | 6/2013 | Oberoi .................... B64F 5/0009 29/897.2 |
| 2013/0158697 A1 | 6/2013 | Stone et al. |
| 2013/0226340 A1 | 8/2013 | Buchstab |
| 2014/0157588 A1 * | 6/2014 | Boyd ..................... B64F 5/0009 29/703 |
| 2014/0277717 A1 * | 9/2014 | Jung ..................... B25J 9/1682 700/248 |
| 2014/0305217 A1 * | 10/2014 | Tapia .................... B64F 5/0045 73/618 |
| 2014/0340509 A1 | 11/2014 | Fairbairn |
| 2015/0135535 A1 * | 5/2015 | Hallam ................. B64F 5/0036 29/889.1 |
| 2015/0266147 A1 * | 9/2015 | Reid ...................... B23P 21/004 29/525.01 |
| 2016/0128656 A1 * | 5/2016 | Gregerson ............... A61B 6/035 180/209 |

FOREIGN PATENT DOCUMENTS

| | | | |
|---|---|---|---|
| CA | 2553747 C * | 7/2013 | ............ E01B 29/17 |
| DE | 102008041190 A1 * | 3/2010 | ............ B25J 9/026 |
| DE | EP 2792431 A1 * | 10/2014 | ............ B21J 15/142 |
| EP | 1227316 A2 | 7/2002 | |
| EP | 1884453 A2 | 2/2008 | |
| EP | 2108515 A1 | 10/2009 | |
| EP | 2221151 A2 | 8/2010 | |
| EP | 2631041 A2 | 8/2013 | |
| GB | 2095215 A * | 9/1982 | ........... B66C 19/002 |
| GB | 2473100 A | 3/2011 | |
| GB | 2498977 A | 8/2013 | |
| WO | WO2010018340 | 2/2010 | |
| WO | WO2014193602 A2 | 12/2014 | |

OTHER PUBLICATIONS

Partial European Search Report, dated Sep. 30, 2015, regarding Application No. EP14196480.9, 6 pages.
Extended European Search Report, dated Oct. 2, 2015, regarding Application No. EP14196553.3, 7 pages.
Extended European Search Report, dated Jan. 27, 2016, regarding Application No. EP14196480.9, 10 pages.
Spishak et al., "Magnet Sensing Hole Driller and Method Therefor," U.S. Appl. No. 13/931,165, filed Jun. 28, 2013, 33 pages.
Larson et al., "Modular Stanchion System," U.S. Appl. No. 13/926,646, filed Jun. 25, 2013, 31 pages.

(56) References Cited

OTHER PUBLICATIONS

Desjardien et al., "Modular and Reconfigurable Support System," U.S. Appl. No. 13/904,789, filed May 29, 2013, 73 pages.
Best et al., "Apparatus and Method for Moving a Structure in a Manufacturing Environment," U.S. Appl. No. 13/940,843, filed Jul. 12, 2013, 45 pages.
Valenzuela et al., "Systems and Methods for Movement of Objects," U.S. Appl. No. 14/189,828, filed Feb. 25, 2014, 41 pages.
Larson et al., "Modular Stanchion System," U.S. Appl. No. 14/265,946, filed Apr. 30, 2014, 34 pages.
Cobb et al., "Metrology System for Positioning Assemblies," U.S. Appl. No. 14/559,034, filed Dec. 3, 2014, 84 pages.
Day et al., "Crawler Robot and Supporting Platform," U.S. Appl. No. 14/558,850, filed Dec. 3, 2014, 78 pages.
Desjardien et al., "Apparatus, System, and Method for Supporting a Wing Assembly," U.S. Appl. No. 14/558,834, filed Dec. 3, 2014, 88 pages.
Reid et al., "System and Method for Positioning an Automated Assembly Tool Relative to a Structure," U.S. Appl. No. 14/558,853, filed Dec. 3, 2014, 128 pages.
Reid et al., "Mobile Automated Assembly Tool for Aircraft Structures," U.S. Appl. No. 14/558,859, filed Dec. 3, 2014, 76 pages.
Day et al., "Flexible Manufacturing System for Aircraft Structures," U.S. Appl. No. 14/558,867, filed Dec. 3, 2014, 153 pages.
Office Action, dated Mar. 4, 2016, regarding U.S. Appl. No. 14/558,850, 24 pages.
Extended European Search Report, dated Apr. 8, 2016, regarding Application No. EP14196494.0, 6 pages.
Extended European Search Report, dated May 2, 2016, regarding Application No. EP14196483.3, 7 pages.
Extended European Search Report, dated May 2, 2016, regarding Application No. EP14196468.4, 7 pages.
Extended European Search Report, dated May 3, 2016, regarding Application No. EP14196548.3, 7 pages.
Office Action, dated May 12, 2016, regarding U.S. Appl. No. 14/558,859, 27 pages.
Final Office Action, dated Aug. 2, 2016, regarding U.S. Appl. No. 14/558,850, 33 pages.
Notice of Allowance, dated Jul. 7, 2016, regarding U.S. Appl. No. 14/558,859, 29 pages.
Office Action, dated Nov. 10, 2016, regarding U.S. Appl. No. 14/558,850, 23 pages.
Canadian Intellectual Property Office Search Report, dated Feb. 24, 2017, regarding Application No. 2,883,614, 17 pages.
Canadian Intellectual Property Office Search Report, dated Feb. 23, 2017, regarding Application No. 2,896,059, 11 pages.
Canadian Intellectual Property Office Office Action, dated Mar. 1, 2017, regarding Application No. 2,882,420, 7 pages.
Canadian Intellectual Property Office Office Action, dated Mar. 31, 2017, regarding Application No. 2,882,466, 20 pages.
Canadian Intellectual Property Office Office Action, dated Mar. 30, 2017, regarding Application No. 2,882,4485, 17 pages.
Notice of Allowance, dated Apr. 24, 2017, regarding U.S. Appl. No. 14/558,850, 11 pages.
Office Action, dated May 3, 2017, regarding U.S. Appl. No. 14/559,034, 55 pages.

* cited by examiner

MOBILE AUTOMATED OVERHEAD ASSEMBLY TOOL FOR AIRCRAFT STRUCTURES

RELATED PROVISIONAL APPLICATION

This application claims the benefit of U.S. Provisional Patent Application Ser. No. 61/986,807, filed Apr. 30, 2014, and entitled "Mobile Automated Overhead Assembly Tool for Aircraft Structures."

CROSS-REFERENCE TO RELATED APPLICATIONS

This application is related to the following patent applications: entitled "Crawler Robot and Supporting Platform," Ser. No. 14/558,850, entitled "Mobile Automated Assembly Tool for Aircraft Structures," Ser. No. 14/558,859, entitled "Metrology System for Positioning Assemblies," Ser. No. 14/559,034, entitled "Flexible Manufacturing System for Aircraft Structures," Ser. No. 14/558,867, entitled "System and Method for Positioning an Automated Assembly Tool Relative to a Structure," Ser. No. 14/558,853, and entitled "Apparatus, System, and Method for Supporting a Wing Assembly," Ser. No. 14/558,834, filed of even date herewith, each assigned to the same assignee, and each incorporated herein by reference in its entirety.

BACKGROUND INFORMATION

1. Field

The present disclosure relates generally to aircraft and, in particular, to manufacturing aircraft structures. Still more particularly, the present disclosure relates to a method and apparatus for performing operations on an aircraft structure using an autonomous tool system.

2. Background

Various parts may be manufactured and assembled to form different aircraft structures for an aircraft. For example, without limitation, ribs, stringers, and spars may be assembled together to form a wing structure for a wing of an aircraft. Skin panels may then be placed over the wing structure and secured to the structure to form the wing.

Assembly of an aircraft structure may include, for example, without limitation, drilling one or more holes through multiple parts and installing fasteners through these holes to secure the parts to each other. Some of these operations may be performed manually by human operators using handheld tools.

To satisfy ergonomic considerations for the human operators, existing solutions may require assembly to be completed while the aircraft structure is in a vertical orientation. For instance, when assembling a wing, some currently used systems orient the wing with the trailing edge down and the leading edge up. Human operators maneuver about the wing, on the ground, or use work platforms, to assemble the wing.

Once operations are performed on one portion of the aircraft structure, the aircraft structure must be reoriented or moved between locations. This process may involve disconnecting the aircraft structure from fixtures holding it in place, moving the aircraft structure between locations, and reconnecting the aircraft structure to a different set of fixtures. In some cases, the aircraft structure may be flipped such that human operators can reach the other side of the aircraft structure.

This assembly process may take more time or use more resources than desired. For example, the time needed to disconnect, move, and reconnect the aircraft structure significantly decreases the production rate of the facility. As another example, countless labor hours are needed to assemble a single aircraft structure, which increases the cost of production.

This assembly process also may take more space than desired. For example, the empty space needed to move the aircraft structure into the facility, as well as the path to rotate, tilt, sweep, translate, raise or lower or tilt the aircraft structure significantly decreases the efficient use of space in the facility. As another example, during the installation or retrofit of a large structure, the space may not be usable for manufacture.

Other currently available methods may use automated systems for assembling the aircraft structure. However, some of these automated systems may be larger in size and heavier than desired. In other cases, these automated systems may employ robotic devices bolted to the floor of the manufacturing facility. The size, weight, and immovable nature of these automated systems may decrease the flexibility and reconfigurability of the manufacturing facility. Consequently, the assembly of an aircraft structure may take more time or be more costly than desired. Accordingly, there is a need for a method and apparatus that provide a more efficient, high production rate process for assembling aircraft structures.

SUMMARY

In one illustrative embodiment, an apparatus may comprise a motion platform and an overhead support system. The motion platform may be configured to be positioned above a work surface of a structure to perform an operation on the work surface. The overhead support system may be configured to carry the motion platform across a floor of a manufacturing environment from a first location to a second location.

In another illustrative embodiment, a method may be provided. A motion platform may be carried across a floor of a manufacturing environment from a first location to a second location using an overhead support system. The motion platform may be positioned above a work surface of a structure to perform an operation on the work surface.

In yet another illustrative embodiment, an assembly system for installing a fastener may comprise a hexapod and a gantry system. The hexapod may be configured to be positioned above an upper skin panel of a structure to install the fastener in the upper skin panel. The gantry system may be configured to be driven across a floor of a manufacturing environment from a first location to a second location.

In still another illustrative embodiment, a method for installing a fastener may be provided. A gantry system carrying a hexapod may be driven across a floor of a manufacturing environment from a first location to a second location using a movement system. The hexapod may be positioned moveably above an upper skin panel of a structure to perform an operation on the upper skin panel.

In still another illustrative embodiment, a method for positioning a tool on a surface may be provided. The tool may be moved relative to the surface to roughly position the tool within a selected region on the surface using a first movement system. The tool may be moved relative to the surface with at least one degree of freedom to precisely position the tool at a selected position within the selected region on the surface using a second movement system.

In still yet another illustrative embodiment, a method for positioning a tool on a surface may be provided. The tool may be moved relative to the surface to roughly position the tool within a selected region on the surface using a first movement system. The tool may be moved relative to the surface with at least one degree of freedom to precisely position the tool at a selected position within the selected region on the surface using a second movement system. An element associated with the tool may be aligned for performing an operation at the selected position relative to the selected position using a third movement system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, without limitation, the illustrative embodiments recognize and take into account that it may be desirable to automate the performance of manufacturing operations on an aircraft structure while the aircraft structure is in a horizontal orientation. In particular, the illustrative embodiments recognize and take into account that it may be desirable to have an automated device capable of performing drilling, measuring, inspecting, and fastening operations from above the aircraft structure as the aircraft structure moves about the manufacturing facility.

The illustrative embodiments also recognize and take into account that it may be desirable to perform manufacturing operations from above the aircraft structure without the use of fixed monument fixture. In this illustrative example, a "fixed monument fixture" is not configured to be moved from one location to another location in the manufacturing facility. For example, without limitation, these fixed monument fixtures may include robotic devices bolted to the facility floor, a fixed gantry system, or other structures. Fixed monument fixtures may reduce flexibility within a manufacturing facility, take up more room than desired, and allow limited access to the aircraft structure. Moreover, fixed monuments may be more costly to manufacture, reconfigure, or maintain than desired.

The illustrative embodiments further recognize and take into account that it may be desirable to have an automated device capable of moving quickly back and forth above the aircraft structure to perform the operations from overhead. As an example, the illustrative embodiments recognize and take into account that it may be desirable to have an overhead support system that carries the automated device and moves autonomously about the manufacturing environment.

Thus, the illustrative embodiments may provide a method and apparatus for performing an operation on a work surface of a structure from overhead. The apparatus may comprise a motion platform and an overhead support system. The motion platform may be configured to be positioned above the work surface of the structure to perform the operation on the work surface. The overhead support system may be configured to carry the motion platform across a floor of a manufacturing environment from a first location to a second location.

Figure 1:
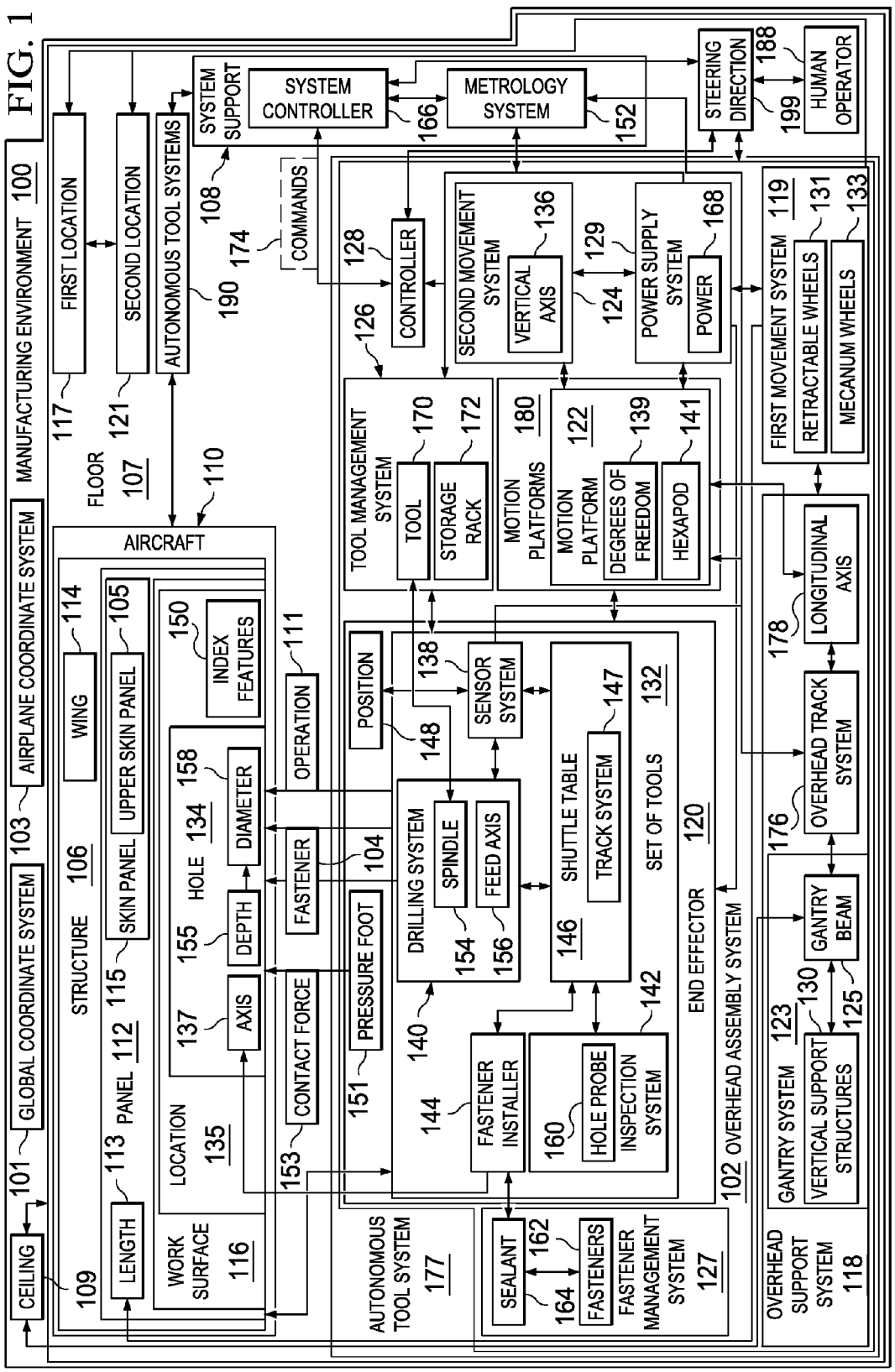
FIG. 1 is an illustration of a block diagram of a manufacturing environment in accordance with an illustrative embodiment.

Turning now to FIG. 1, an illustration of a block diagram of a manufacturing environment is depicted in accordance with an illustrative embodiment. In this depicted example, manufacturing environment 100 is an environment in which overhead assembly system 102 may be used to install fastener 104 in structure 106. Manufacturing environment 100 may have floor 107 and ceiling 109 above floor 107.

As depicted, manufacturing environment 100 may include structure 106, autonomous tool system 177, and system support 108. In this illustrative example, structure 106 may be an object in aircraft 110. For example, without limitation, structure 106 may be incorporated in at least one of a wing, a fuselage, a horizontal stabilizer, a door, a housing, an engine, and other suitable structures.

In this illustrative example, structure 106 may take the form of panel 112 of wing 114 in aircraft 110. Panel 112 may be skin panel 115 in this illustrative example. For instance, panel 112 may be upper skin panel 105 for wing 114. In other illustrative examples, panel 112 may be a skin panel for a vertical stabilizer in aircraft 110. Panel 112 may have work surface 116.

In this depicted example, autonomous tool system 177 may be configured to perform operation 111 on panel 112. Operation 111 may be referred to as an assembly operation in this illustrative example. For instance, overhead assembly system 102 may be configured to perform at least one of a drilling operation, a fastening operation, an inspection operation, a measurement operation, a cleaning operation, a sealing operation, a data collection operation, or other suitable types of operation 111.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, autonomous tool system 177 may take the form of overhead assembly system 102. In this manner, overhead assembly system 102 may be referred to as an autonomous tool or an autonomous tool system. In an illustrative example, overhead assembly system 102 may be configured to install fastener 104 in work surface 116 of panel 112.

Overhead assembly system 102 may include a number of components. As used herein, a "number of" items may be one or more items. In this illustrative example, a number of components may be one or more components. Each component in overhead assembly system 102 may move with at least one degree of freedom up to six degrees of freedom. For instance, each component may move with at least one degree of translational freedom or at least one degree of rotational freedom, but can have up to three degrees of translational freedom, up to three degrees of rotational freedom, or both. Each component may move with at least one degree of freedom independently of other components in overhead assembly system 102 in some examples.

Overhead assembly system 102 may be located and positioned based on at least one of global coordinate system 101 and airplane coordinate system 103. Global coordinate system 101 may be a reference coordinate system for manufacturing environment 100.

Airplane coordinate system 103 may represent a reference coordinate system in which airplane parts are located in three-dimensional space. Airplane coordinate system 103 may be based on an origin or reference point in aircraft 110. Using at least one of global coordinate system 101 and airplane coordinate system 103, overhead assembly system 102 and the components within overhead assembly system 102 may be crudely and precisely positioned relative to structures within manufacturing environment 100. As depicted, overhead assembly system 102 may comprise overhead support system 118, first movement system 119, end effector 120, motion platform 122, second movement system 124, tool management system 126, fastener management system 127, controller 128, and power supply system 129.

In this illustrative example, overhead support system 118 may be a mechanical device that carries motion platform 122. Overhead support system 118 may be configured to move about manufacturing environment 100.

In this illustrative example, overhead support system 118 and the components associated with overhead support system 118 are not fixed in a location. Rather, the entirety of overhead support system 118 may move relative to floor 107 and ceiling 109 of manufacturing environment 100. For example, without limitation, overhead support system 118 may use first movement system 119 to move from first location 117 to second location 121 on floor 107 of manufacturing environment 100.

In this depicted example, overhead support system 118 may be a drivable device. As used herein, an item that is "drivable" may be an item that can drive to different positions by moving or being guided. Driving an item may include moving the item by at least one of translating the item with at least one degree of translational freedom or rotating the item with at least one degree of rotational freedom. Further, driving an item may include moving the entirety of the item and all of the components that make up the item together in unison. A drivable item may be capable of autonomously driving to different locations. In other words, the item may have autonomous or semi-autonomous drive capability to move in its entirety from one location to another location relative to floor 107, ceiling 109, or both in manufacturing environment 100.

In other cases, a drivable item may be driven by some other system. For example, without limitation, a controller, a movement system, a human operator, or some other type of device or operator may drive an item. In this manner, a drivable item may be electronically driven, mechanically driven, electromechanically driven, manually driven, or driven in some other manner. In this illustrative example, overhead support system 118 may be driven across floor 107 in manufacturing environment 100 using first movement system 119 under the control of controller 128, system controller 166, human operator 188, some other device, or a combination thereof.

As illustrated, first movement system 119 may be physically associated with overhead support system 118. A first component, such as first movement system 119, may be considered to be physically associated with a second component, such as overhead support system 118, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of the second component, as an extension of the second component, or a combination thereof.

In this depicted example, first movement system 119 may comprise a number of components configured to move overhead support system 118 from first location 117 to second location 121. For instance, first movement system 119 may include wheels, a track system, pulleys, lift jacks attached to the corners of overhead support system 118, or other suitable movement devices.

In an illustrative example, first location 117, second location 121, or both may be a stowed location for overhead support system 118, a location in which operation 111 is being performed on panel 112 of structure 106, a location in which operation 111 is being performed on another structure, or some combination thereof. For example, first movement system 119 may be configured to move overhead support system 118 carrying motion platform 122 back and forth along length 113 of structure 106 to perform operation 111 on work surface 116.

In some illustrative examples, either first location 117 or second location 121 may be locations outside of manufacturing environment 100. First movement system 119 may be designed to move overhead support system 118 in a desired manner between first location 117 and second location 121 in this illustrative example.

First movement system 119 may be oriented above, below, or alongside overhead support system 118. In an illustrative example, overhead support system 118 may be mounted to ceiling 109. In this case, overhead support system 118 may be mounted directly or indirectly to ceiling 109 and move relative to ceiling 109 using first movement system 119.

In another illustrative example, overhead support system 118 may take the form of gantry system 123 having gantry beam 125 and vertical support structures 130. In this case, first movement system 119 may drive gantry system 123 carrying motion platform 122 across floor 107 of manufacturing environment 100 to second location 121.

In an illustrative example, first movement system 119 may include retractable wheels 131. Retractable wheels 131 may be retracted to lower overhead support system 118 to floor 107 after reaching second location 121. Lowering overhead support system 118 to floor 107 of manufacturing environment 100 may increase the stability of overhead assembly system 102 during installation of fastener 104. In particular, lowering overhead support system 118 to floor 107 may temporarily plant overhead support.

After the installation of fastener 104 is completed, retractable wheels 131 may be extended to lift overhead support system 118 from floor 107 and move overhead support system 118 from first location 117 to second location 121 on floor 107 of manufacturing environment 100. When overhead support system 118 is mounted to ceiling 109, other types of stabilizing mechanisms may be used.

In this depicted example, first movement system 119 may include mecanum wheels 133. Mecanum wheels 133 may allow overhead support system 118 to achieve omni-directional movement. In other words, mecanum wheels 133 may move overhead support system 118 forward and backward, as well as side to side. Once overhead support system 118 is in second location 121, motion platform 122 may be used to position end effector 120 relative to work surface 116 of structure 106 as desired.

In some illustrative examples, mecanum wheels 133 also may be retractable or may lock to substantially prevent undesired movement of overhead support system 118. In other illustrative examples, first movement system 119 may include holonomic wheels, another type of omni-wheels, casters, other suitable movement devices, or a combination thereof.

As depicted, end effector 120 may be a device to which set of tools 132 are attached. In particular, end effector 120 may be configured to hold set of tools 132. Set of tools 132 may be used to install fastener 104 in panel 112.

As used herein, a "set" of items may be one or more items. In this illustrative example, set of tools 132 may be one or more tools. When two or more tools are present in set of tools 132, the tools also may be referred to as a group of tools, a plurality of tools, simply "tools," or the like.

In this illustrative example, motion platform 122 may be a device configured to position set of tools 132 on end effector 120 relative to location 135 on work surface 116 of panel 112 to install fastener 104. Specifically, motion platform 122 may be configured to position set of tools 132 on end effector 120 perpendicular to work surface 116 at location 135.

In this depicted example, motion platform 122 provides fine positioning for end effector 120 relative to location 135. Location 135 may be a desired location for drilling hole 134 for fastener 104.

When set of tools 132 are positioned perpendicular to location 135 on work surface 116, fastener 104 may be installed in a desired manner. For instance, positioning set of tools 132 perpendicular to work surface 116 at location 135 may allow set of tools 132 to drill hole 134 in the center of location 135.

Drilling hole 134 in this manner may provide a desired alignment for fastener 104 when inserted into hole 134. In another illustrative example, positioning set of tools 132 perpendicular to work surface 116 at location 135 may allow set of tools 132 to drill hole 134 without forming a crack, delamination, or other out of tolerance inconsistencies in panel 112.

In other illustrative examples, set of tools 132 may not be positioned perpendicular to work surface 116 at location 135. Instead, set of tools 132 may be positioned at various angles to install fastener 104 in a desired manner.

In this depicted example, motion platform 122 may take various forms. Motion platform 122 takes the form of hexapod 141 in this illustrative example. In other illustrative examples, motion platform 122 may take the form of a light weight serial robot, a scara robot, a Stewart platform, or other suitable types of motion platforms.

Motion platform 122 may provide degrees of freedom 139 of movement for end effector 120. In an illustrative example, degrees of freedom 139 may refer to the movement of end effector 120 in three-dimensional space. For instance, motion platform 122 may be configured to provide seven degrees of freedom 139 for end effector 120.

As illustrated, second movement system 124 may be associated with motion platform 122. Second movement system 124 may comprise a number of components configured to move motion platform 122 along vertical axis 136 toward work surface 116 of panel 112.

Vertical axis 136 may be an axis substantially perpendicular to floor 107 in this illustrative example. In some cases, vertical axis 136 may be perpendicular to work surface 116 at location 135. In such a case, axis 137 and vertical axis 136 may be the same. Set of tools 132 on end effector 120 may move along vertical axis 136 as motion platform 122 moves.

In this illustrative example, set of tools 132 may comprise a number of different types of tools. Set of tools 132 may include sensor system 138, drilling system 140, inspection system 142, and fastener installer 144 in this illustrative example.

In an illustrative example, set of tools 132 may be positioned on shuttle table 146 on end effector 120. Shuttle table 146 may hold set of tools 132 and move set of tools 132.

Shuttle table 146 may be configured to move set of tools 132 along track system 147. As an example, shuttle table 146 may move set of tools 132 back and forth relative to work surface 116 of panel 112 using track system 147.

As illustrated, sensor system 138 may comprise various sensing devices configured to identify at least one of work surface 116, position 148 of end effector 120 relative to location 135 on work surface 116, or location 135 on work surface 116 of panel 112 to drill hole 134 for fastener 104. For example, without limitation, sensor system 138 may include a camera, a proximity sensor, a magnetic through-skin sensor, or some other suitable type of sensor.

After using at least one of first movement system 119 and second movement system 124, position 148 of end effector 120 may be verified using sensor system 138. In this illustrative example, position 148 may include a location, an orientation, or both for end effector 120 relative to work surface 116 of panel 112.

In some illustrative examples, sensor system 138 may be configured to identify position 148 of end effector 120 relative to location 135 on work surface 116 based on index features 150 of work surface 116. Index features 150 may be pre-determined reference points on work surface 116. Index features 150 may take the form of at least one of a magnet, a sensor, a graphical indicator, a radio-frequency identification tag, a target, or some other suitable type of index feature. End effector 120 may be moved along work surface 116 based on position 148 of index features 150. Index features 150 also may be used to identify where to drill hole 134 in work surface 116.

In some other illustrative examples, sensor system 138 may communicate with metrology system 152 in system support 108 to identify position 148 of end effector 120. Metrology system 152 may be one or more measurement devices in this illustrative example.

System support 108 with metrology system 152 may be configured to support operation of overhead assembly system 102. Specifically, system support 108 may provide navigation, utilities, position information, task assignment, and other suitable types of resources.

As an example, system support 108 may provide navigation for overhead assembly system 102. As another example, metrology system 152 may be configured to make measurements of structure 106. In some cases, system support 108 may provide electricity, air, hydraulic fluid, water, vacuum, or other utilities to overhead assembly system 102. Further, system support 108 may also be configured to provide these resources to various other devices located in manufacturing environment 100.

In this illustrative example, pressure foot 151 may be connected to end effector 120. Pressure foot 151 may be a pressure-sensing device. Pressure foot 151 may be the first portion of end effector 120 to contact work surface 116 of panel 112.

In this illustrative example, pressure foot 151 may be configured to identify contact force 153 between pressure foot 151 and work surface 116. Contact force 153 may be an amount of force exerted on work surface 116 by end effector 120.

Pressure foot 151 may sense contact force 153 using a load cell or some other type of load sensor. An indication of contact force 153 may be desirable to reduce the risk of damage to at least one of work surface 116, end effector 120, or both.

In some cases, pressure foot 151 may be manually or automatically removed and replaced to optimize contact area to panel 112. For instance, pressure foot 151 may be interchanged with a pressure foot having a different diameter, shape, or other feature. In some illustrative examples, pressure foot 151 may be designed to safely break away in the event of an undesired encounter with work surface 116 to avoid damage of panel 112, components within overhead assembly system 102, or both.

A desired contact force 153 may be needed in this illustrative example. For instance, contact force 153 may be used to clamp panel 112 to the substructure for panel 112 before installing fastener 104. As an example, panel 112 may need to be pressed against a rib, spar, or load bearing fitting for proper installation of fastener 104.

Once end effector 120 and set of tools 132 are in position, overhead assembly system 102 may drill hole 134 in location 135 on work surface 116 of panel 112. Overhead assembly system 102 may drill hole 134 in location 135 on work surface 116 using drilling system 140 in this illustrative example.

Drilling system 140 may be configured to drill different types of holes in location 135 on work surface 116. For example, without limitation, hole 134 may take the form of a cylindrical hole, a conical hole, a countersunk hole, a counterbored hole, a spot face, a blind hole, or some other type of hole.

Drilling system 140 may include spindle 154 and feed axis 156. In this illustrative example, spindle 154 may comprise a number of mechanical parts configured to rotate to drill hole 134. As an example, spindle 154 may include a drill bit on an end of spindle 154. Spindle 154 may rotate the drill bit to drill hole 134 with depth 155 and diameter 158 in a desired manner. In another example, spindle 154 may rotate a cutter. Spindle 154 may be operated using hydraulic power, pneumatic power, electricity, or some other energy source.

In some cases, the mechanical parts in spindle 154 may be changed based on the requirements for hole 134. For instance, the drill bit on spindle 154 may be changed to change at least one of depth 155 or diameter 158 of hole 134. For example, a thinner bit may be used to decrease diameter 158 of hole 134. In other illustrative examples, a longer cutter may be used to increase depth 155 of hole 134.

As depicted, feed axis 156 may be an axis perpendicular to work surface 116 at location 135. Feed axis 156 may include various mechanical parts configured to move spindle 154 relative to work surface 116 at location 135 to drill hole 134. For example, without limitation, feed axis 156 may include a platform, a track system, a load cell, a roller bearing, and other mechanical parts. Feed axis 156 may move spindle 154 toward location 135 to drill hole 134. When hole 134 is completed, feed axis 156 may move spindle 154 in the opposite direction.

After drilling hole 134, overhead assembly system 102 may inspect hole 134. Overhead assembly system 102 may use inspection system 142 to inspect hole 134. Inspection system 142 may inspect at least one of depth 155 or diameter 158 of hole 134. Inspection system 142 may inspect diameter 158 of hole 134 using hole probe 160.

In this illustrative example, hole probe 160 may be an elongate device configured to measure diameter 158 of hole 134. In some illustrative examples, hole probe 160 may be inserted into hole 134 to determine if hole 134 has a desired diameter. Depending on the type of hole 134 formed, inspection system 142 may be used to inspect other parameters for hole 134. For example, without limitation, inspection system 142 may be used to inspect at least one of countersink depth, countersink angle, countersink normality to location 135, the normality of hole 134 to location 135, countersink diameter, grip length, or some other parameter for hole 134.

Hole probe 160 may be interchangeable in this illustrative example. In other words, hole probe 160 may be removed to place a different probe into inspection system 142. Different probes may be placed into inspection system 142 to inspect different diameters. In some illustrative examples, hole probe 160 may be replaced with a thinner probe to inspect hole 134 having a smaller diameter. In other illustrative examples, hole probe 160 may be replaced with a thicker probe to inspect hole 134 having a larger diameter.

After inspecting hole 134, overhead assembly system 102 may place fastener 104 into hole 134. Fastener 104 may join panel 112 to a part positioned against panel 112. For example, without limitation, fastener 104 may join panel 112 to a rib, a spar, or some other structural member in wing 114. In another illustrative example, fastener 104 may join one skin panel to another skin panel in panel 112.

In this depicted example, fastener 104 may take the form of one of a rivet, a lockbolt, a bolt, a hexdrive, and other suitable types of fasteners.

Fastener 104 may be placed in hole 134 using fastener installer 144. In this illustrative example, fastener installer 144 may be a mechanical device configured to apply a force to fastener 104 to insert fastener 104 in hole 134. In some illustrative examples, fastener installer 144 may accommodate several diameters of fasteners.

Fastener management system 127 may hold fasteners 162 and other parts for fastener installer 144. Fastener management system 127 may be configured to hold several different diameters and grip lengths of fasteners 162. Fastener management system 127 may also perform other functions. For example, fastener management system 127 may perform at least one of washing fasteners 162 to remove any residue, applying sealant 164 to fasteners 162, inspecting the sealant application on the fastener, supplying one of fasteners 162 having sealant 164 to fastener installer 144, or other desirable actions.

In this illustrative example, sealant 164 may take the form of a polymeric material, a dielectric material, paint, or some other type of coating material. Sealant 164 may be configured to provide electromagnetic effect protection for fasteners 162, seal hole 134, or perform various other functions.

As illustrated, tool management system 126 may include a number of parts configured to exchange tool 170 between storage rack 172 and end effector 120. Tool 170 may be one of set of tools 132 configured for use on end effector 120. In this illustrative example, storage rack 172 may be a structure used to hold tool 170 and other tools when not used by end effector 120. Tool management system 126 may place tool 170 on end effector 120 when tool 170 is needed. In a similar fashion, tool management system 126 may take a tool that is no longer needed off end effector 120 and place it in storage rack 172.

In this illustrative example, controller 128 may be a device configured to control operation of overhead assembly system 102. Controller 128 may be in communication with the various components in overhead assembly system 102, as well as system controller 166 and metrology system 152 in system support 108.

When one component is "in communication" with another component, the two components may be configured to send signals back and forth over a communications medium. For example, without limitation, controller 128 may communicate with system controller 166 wirelessly over a network. In another illustrative example, controller 128 may communicate with motion platform 122 via a wired or wireless connection.

Controller 128 may be further configured to prevent undesired encounters with human operator 188, autonomous tool systems 190, or both in manufacturing environment 100. In this illustrative example, autonomous tool systems 190 may be other devices configured to work on panel 112. In some examples, autonomous tool systems 190 may be referred to as automated tools.

Controller 128 may use system support 108 to determine the location of human operator 188 and maneuver overhead assembly system 102 around human operator 188. Controller 128 also may be configured to shut down overhead assembly system 102 if human operator 188 is too close to overhead assembly system 102. In still another illustrative example, controller 128 may use system support 108 to determine the location of autonomous tool systems 190 within manufacturing environment 100 to avoid undesired encounters between overhead assembly system 102 and autonomous tool systems 190.

In this illustrative example, at least one of controller 128 and system controller 166 may be implemented in software, hardware, firmware, or a combination thereof. When software is used, the operations performed by the controller may be implemented using, for example, without limitation, program code configured to run on a processor unit. When firmware is used, the operations performed by the controller may be implemented using, for example, without limitation, program code and data and stored in persistent memory to run on a processor unit.

When hardware is employed, the hardware may include one or more circuits that operate to perform the operations in the controller. Depending on the implementation, the hardware may take the form of a circuit system, an integrated circuit, an application specific integrated circuit (ASIC), a programmable logic device, or some other suitable type of hardware device configured to perform any number of operations.

With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In some illustrative examples, the operations, processes, or both performed by controller 128 and system controller 166 may be performed using organic components integrated with inorganic components. In some cases, the operations, processes, or both may be performed entirely by organic components, excluding a human being. As one illustrative example, circuits in organic semiconductors may be used to perform these operations, processes, or both.

In this illustrative example, controller 128 may be configured to receive commands 174 from system controller 166. In this illustrative example, commands 174 may include at least one of a path from first location 117 to second location 121, or operation 111 to be completed by overhead support system 118 and motion platform 122, or other types of data.

As illustrated, overhead assembly system 102 also may have power supply system 129. Power supply system 129 may include a power source configured to provide power to overhead assembly system 102. This power source may take the form of a battery, a solar cell, a pressurized air generator, a fuel cell, a combustion engine, a cable to an external power source, or some other suitable device. Power supply system 129 may be configured to supply power 168 to overhead assembly system 102 such that utility cables or other connections may not be needed to move overhead assembly system 102 relative to work surface 116 of panel 112.

In an illustrative example, overhead track system 176 may be associated with overhead support system 118. Overhead track system 176 may be configured to move motion platform 122 along longitudinal axis 178 of overhead support system 118. For example, without limitation, overhead track system 176 may move motion platform 122 along longitudinal axis 178 of gantry beam 125 above work surface 116.

Instead of moving overhead support system 118 to accurately position motion platform 122, overhead track system 176 may be used to increase the reach of end effector 120. The combination of movement using overhead track system 176, second movement system 124, and motion platform 122 allows end effector 120 to be precisely positioned relative to location 135 on work surface 116.

In still other illustrative examples, a number of additional motion platforms 180 may be moveably connected to overhead support system 118. Each of motion platforms 180 may be configured to move along overhead track system 176. Motion platforms 180 may simultaneously perform operation 111 on work surface 116 in some illustrative examples.

In this illustrative example, steering direction 199 may be provided for overhead assembly system 102. As an example, steering direction 199 may be provided for overhead support system 118 as overhead support system 118 moves through manufacturing environment 100. Steering direction 199 may take the form of commands, instructions, path generation, physically changing the direction of movement of overhead support system 118, and other methods of guidance for overhead support system 118. In this illustrative example, steering direction 199 may dynamically change as conditions within manufacturing environment 100 change.

Steering direction 199 may be provided by at least one of controller 128, system controller 166, human operator 188, or some other suitable device. As an example, system controller 166 may send commands 174 to steer overhead support system 118. In yet another example, one or more of human operator 188 may steer overhead support system 118 by physically changing its direction. In other illustrative examples, overhead support system 118 may steer itself, not under the direction of a controller.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, first movement system 119 may include at least one of an air system, retractable tracks, or other devices in addition to or in place of retractable wheels 131, mecanum wheels 133, omni wheels or other types of omni-directional wheels, or a combination thereof. In some illustrative examples, a locking mechanism also may be included. In another illustrative example, gravity may hold overhead support system 118 in place.

In still other illustrative examples, set of tools 132 may include tools in addition to or in place of the ones shown in FIG. 1. For example, a cleaning system, a cooling system, a vacuum system, a heating system, a carbon fiber placement system, or some other device also may be positioned on end effector 120.

In yet another illustrative example, multiple gantry systems may be present in manufacturing environment 100. These gantry systems may be connected using a central platform, beam, cable, or other device. One or more of these gantry systems may move simultaneously over work surface 116. In this example, motion platforms 180 may be associated with the gantry systems.

In some illustrative examples, overhead assembly system 102 may be used in conjunction with various other types of autonomous tools to perform operations on structure 106 in FIG. 1. For example, without limitation, overhead assembly system 102 may be used with crawler robots, tack drillers, lower panel assembly systems, and other devices. All of these tools may be autonomous or semi-autonomous tools configured to perform operations substantially concurrently on work surface 116 of structure 106.

With some other embodiments, a counterbalance system may be used with motion platform 122. In such an embodiment, the counterbalance system may offset the weight of motion platform 122 from overhead support system 118, ceiling 109, or both.

Figure 2:
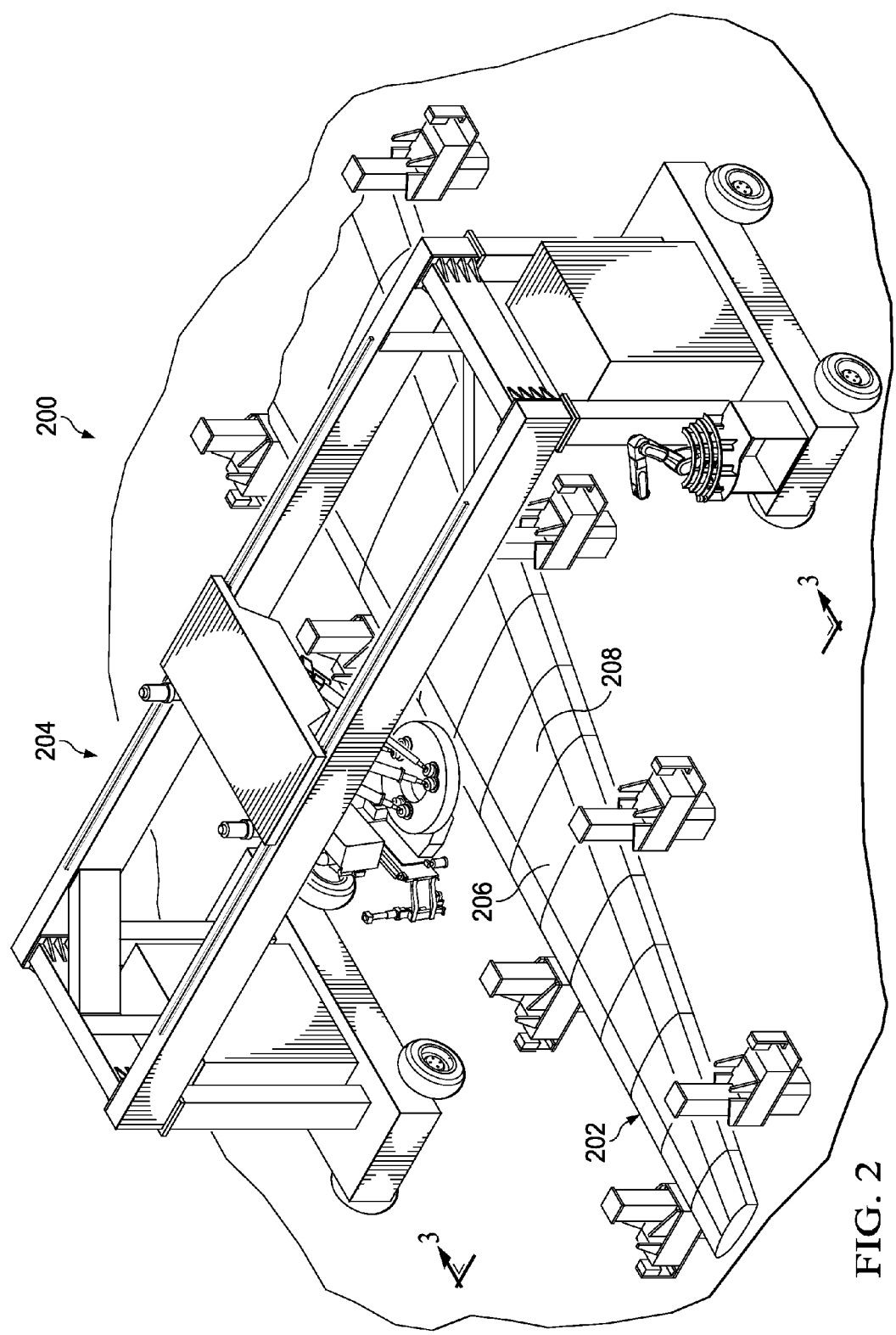
FIG. 2 is an illustration of a manufacturing environment in accordance with an illustrative embodiment.

With reference now to FIG. 2, an illustration of a manufacturing environment is depicted in accordance with an illustrative embodiment. Manufacturing environment 200 may be an example of a physical implementation for manufacturing environment 100 in FIG. 1.

In this depicted example, manufacturing environment 200 may include wing assembly 202. Wing assembly 202 may be an example of a physical implementation for structure 106 shown in block form in FIG. 1. In particular, wing assembly 202 may be an example of a physical implementation for wing 114 in FIG. 1 as wing 114 is being assembled.

As depicted, overhead assembly system 204 may be positioned above wing assembly 202. In this illustrative example, overhead assembly system 204 may be positioned above work surface 206. Work surface 206 may be a surface on panel 208 of wing assembly 202. For instance, panel 208 may be an upper skin panel for wing assembly 202. Work surface 206 and panel 208 may be examples of physical implementations for work surface 116 and panel 112, respectively, shown in FIG. 1. In this illustrative example, overhead assembly system 204 moves freely about manufacturing environment 100 to roughly position itself above wing assembly 202.

Figure 3:
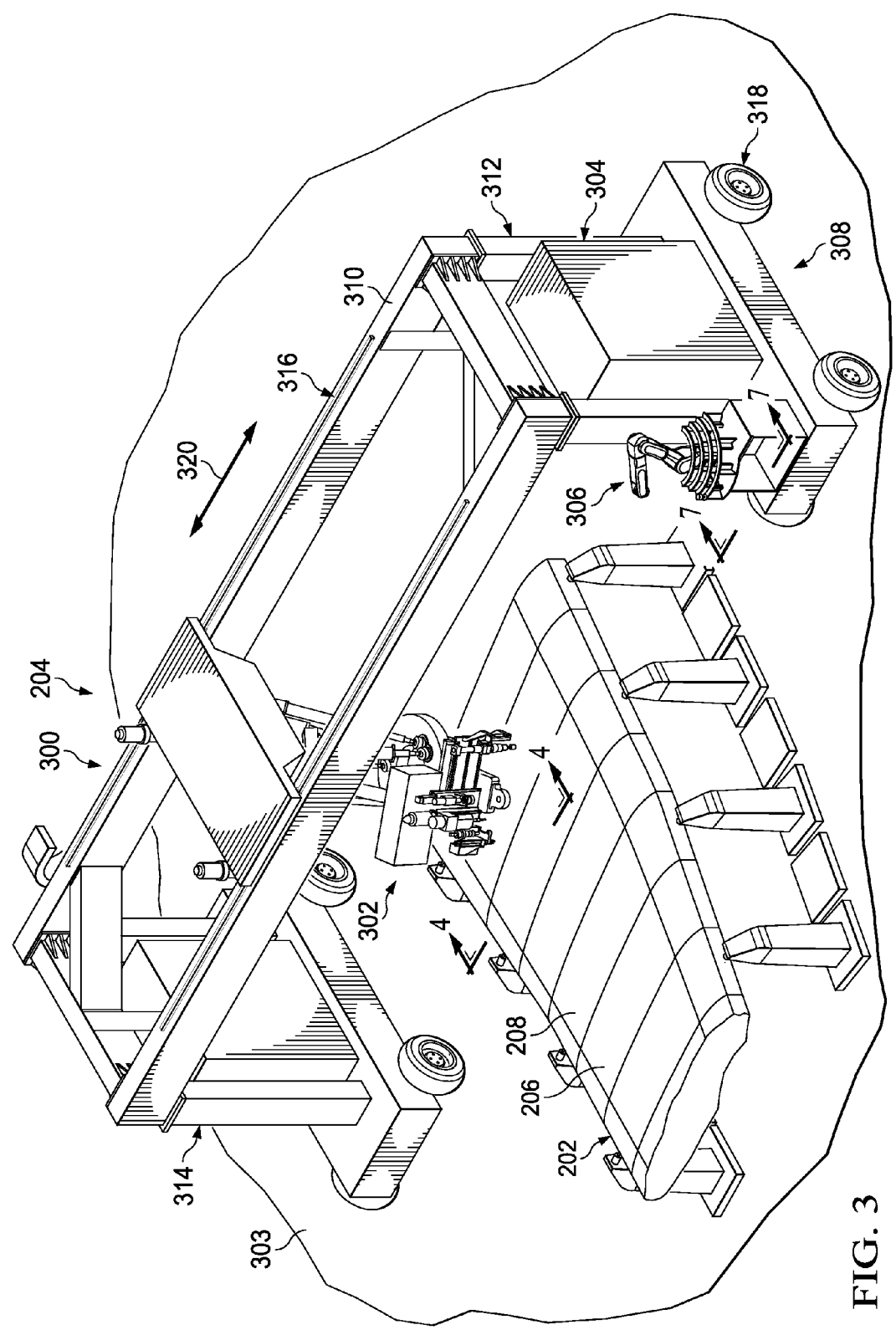
FIG. 3 is an illustration of an overhead assembly system in accordance with an illustrative embodiment.

In FIG. 3, an illustration of overhead assembly system 204 taken along lines 3-3 in FIG. 2 is depicted in accordance with an illustrative embodiment. In this depicted example, an enlarged isometric view of overhead assembly system 204 is shown.

As illustrated, overhead assembly system 204 may include overhead support system 300, hexapod 302, controller 304, tool management system 306, and first movement system 308. Overhead support system 300, hexapod 302, controller 304, tool management system 306, and first movement system 308 may be examples of physical implementations for overhead support system 118, hexapod 141, controller 128, tool management system 126, and first movement system 119, respectively, shown in block form in FIG. 1.

In this illustrative example, overhead support system 300 may carry hexapod 302. Overhead support system 300 may carry hexapod 302 across floor 303 of manufacturing environment 100 in this illustrative example.

As shown, overhead support system 300 may include gantry beam 310, vertical support structure 312, vertical support structure 314, and overhead track system 316. Gantry beam 310 and overhead track system 316 may be examples of implementations for gantry beam 125 and overhead track system 176, while vertical support structure 312 and vertical support structure 314 may be examples of physical implementations for vertical support structures 130 shown in FIG. 1. Gantry beam 310 may take the form of a split beam in this illustrative example.

As illustrated, overhead support system 300 may move relative to wing assembly 202 using first movement system 308. First movement system 308 may take the form of mecanum wheels 318 in this illustrative example. Mecanum wheels 318 may retract or lock to provide increased stability for overhead assembly system 204 while installing a fastener (not shown in this view) in work surface 206 of panel 208.

Mecanum wheels 318 may be an example of a physical implementation for mecanum wheels 133 shown in block form in FIG. 1. In this illustrative example, mecanum wheels 318 may provide omni-directional movement for overhead support system 300.

As depicted, overhead track system 316 may run along a portion of gantry beam 310 in overhead support system 300. Hexapod 302 may move back and forth in the direction of arrow 320 using overhead track system 316 to more precisely position itself in a desired manner relative to work surface 206.

In an illustrative example, tool management system 306 may supply different types of tools to hexapod 302. For example, without limitation, tool management system 306 may exchange drill bits, cutters, hole probes, or other tools with hexapod 302.

In this depicted example, controller 304 may control the operation of each of the components in overhead assembly system 204. For instance, controller 304 may receive commands from a system controller (not shown in this view) to navigate overhead assembly system 204 through manufacturing environment 200. Alternatively, controller 304 may autonomously drive overhead assembly system 204. In still another illustrative example, overhead assembly system 204 may be non-autonomously driven from one location to another location relative to floor 303.

In addition, controller 304 may retract and extend mecanum wheels 318. As another example, controller 304 may communicate with tool management system 306 to provide a desired tool for use on end effector 400 described in more detail below.

Steering direction may be provided as overhead assembly system 204 moves through manufacturing environment 200. Steering direction may be provided by at least one of controller 304, the system controller, a human operator, or some other suitable device. In other illustrative examples, overhead support system 300 may steer itself, not under the direction of a controller.

Figure 4:
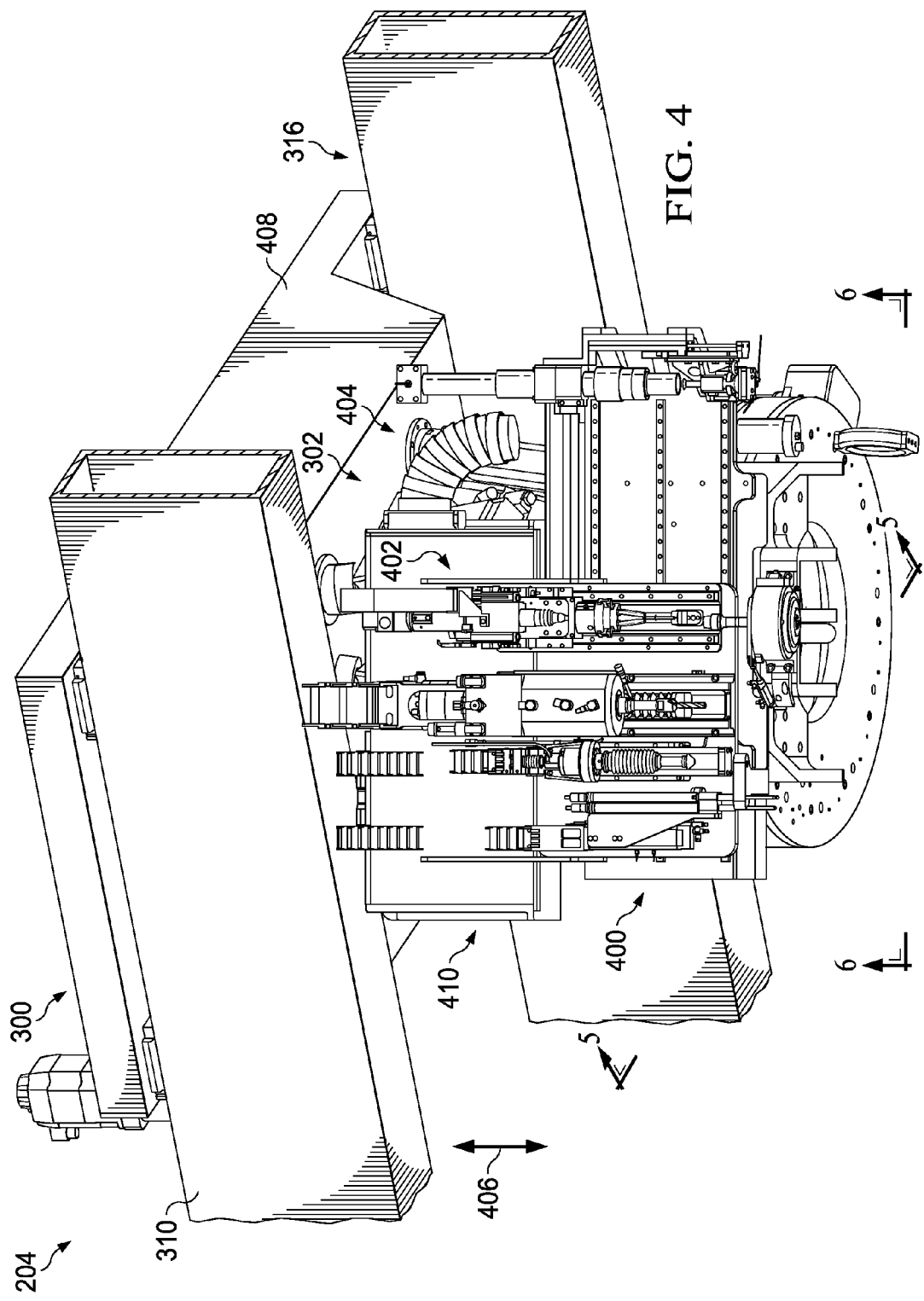
FIG. 4 is an illustration of a hexapod in accordance with an illustrative embodiment.

Turning next to FIG. 4, an illustration of hexapod 302 shown in the direction of lines 4-4 in FIG. 3 is depicted in accordance with an illustrative embodiment. In this depicted example, an enlarged view of hexapod 302 connected to overhead support system 300 is shown such that various components may be seen in greater detail.

As illustrated, end effector 400 may be connected to hexapod 302. Hexapod 302 may move end effector 400 relative to work surface 206 of panel 208 shown in FIG. 2. Specifically, hexapod 302 may provide more precise positioning for end effector 400 relative to work surface 206.

End effector 400 may hold set of tools 402. Set of tools 402 may be used to install a fastener (not shown in this view) in panel 208. Set of tools 402 may be an example of a physical implementation for set of tools 132 shown in block form in FIG. 1.

In this illustrative example, second movement system 404 may move hexapod 302 and end effector 400 up and down along vertical axis 406. Second movement system 404 and vertical axis 406 may be examples of physical implementations for second movement system 124 and vertical axis 136, respectively, shown in FIG. 1.

Hexapod 302 may be connected to platform 408 in this illustrative example. Platform 408 may provide support for hexapod 302 as hexapod 302 moves. Platform 408 may be connected to overhead track system 316 and function to slide hexapod 302 in the direction of arrow 320 in FIG. 3. Second movement system 404 may be connected to platform 408 in some illustrative examples.

As depicted, overhead assembly system 204 also may include fastener management system 410. Fastener management system 410 may be positioned near hexapod 302 for quick access to a supply of various fasteners (not shown). Fastener management system 410 may be an example of a physical implementation for fastener management system 127 shown in block form in FIG. 1.

In this illustrative example, fastener management system 410 may assist set of tools 402 in installing fasteners in work surface 206. For example, without limitation, fastener management system 410 may supply a fastener to set of tools 402 for installation.

Figure 5:
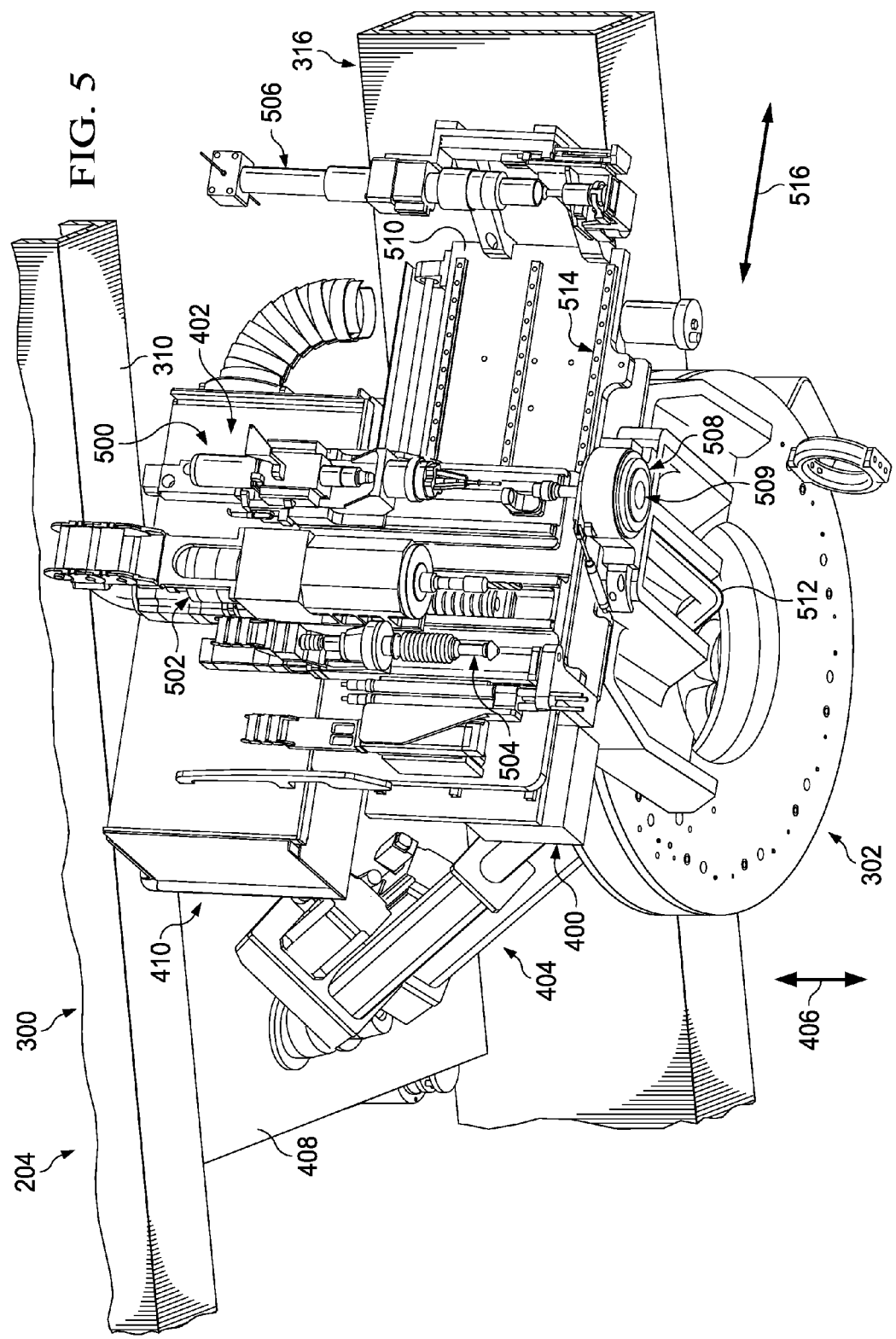
FIG. 5 is an illustration of an end effector and a set of tools in accordance with an illustrative embodiment.

With reference now to FIG. 5, an illustration of end effector 400 and set of tools 402 shown in the direction of lines 5-5 in FIG. 4 is depicted in accordance with an illustrative embodiment. In this example, an enlarged view of end effector 400 is shown such that the components within set of tools 402 and end effector 400 are seen in greater detail.

As depicted, set of tools 402 may include sensor system 500, drilling system 502, inspection system 504, and fastener installer 506. Sensor system 500, drilling system 502, inspection system 504, and fastener installer 506 may be examples of physical implementations for sensor system 138, drilling system 140, inspection system 142, and fastener installer 144, respectively, shown in block form in FIG. 1.

Pressure foot 508 also may be seen in this view. In an illustrative example, pressure foot 508 may be the first contact point with work surface 206 of panel 208 shown in FIG. 2. Pressure foot 508 may be an example of a physical implementation for pressure foot 151 in FIG. 1.

In this depicted example, pressure foot 508 may include channel 509. Channel 509 may be an opening in pressure foot 508. Each tool in set of tools 402 may be extended and retracted through channel 509 to perform operations on panel 208.

A tool in set of tools 402 may move to align with channel 509 of pressure foot 508 before being extended. As operations are performed on panel 208, pressure foot 508 may remain in contact with work surface 206 of panel 208 (not shown) to provide a desired clamping force and alignment.

As illustrated, end effector 400 may include shuttle table 510 and connector 512. Shuttle table 510 may provide structural support for set of tools 402. Shuttle table 510 also may move set of tools 402 along track system 514.

In this illustrative example, shuttle table 510 may move set of tools 402 back and forth in the direction of arrow 516 using track system 514. Shuttle table 510 and track system 514 may be examples of physical implementations for shuttle table 146 and track system 147 shown in FIG. 1. Connector 512 may be an umbilical cable configured to connect set of tools 402 with various utilities in this illustrative example.

Figure 6:
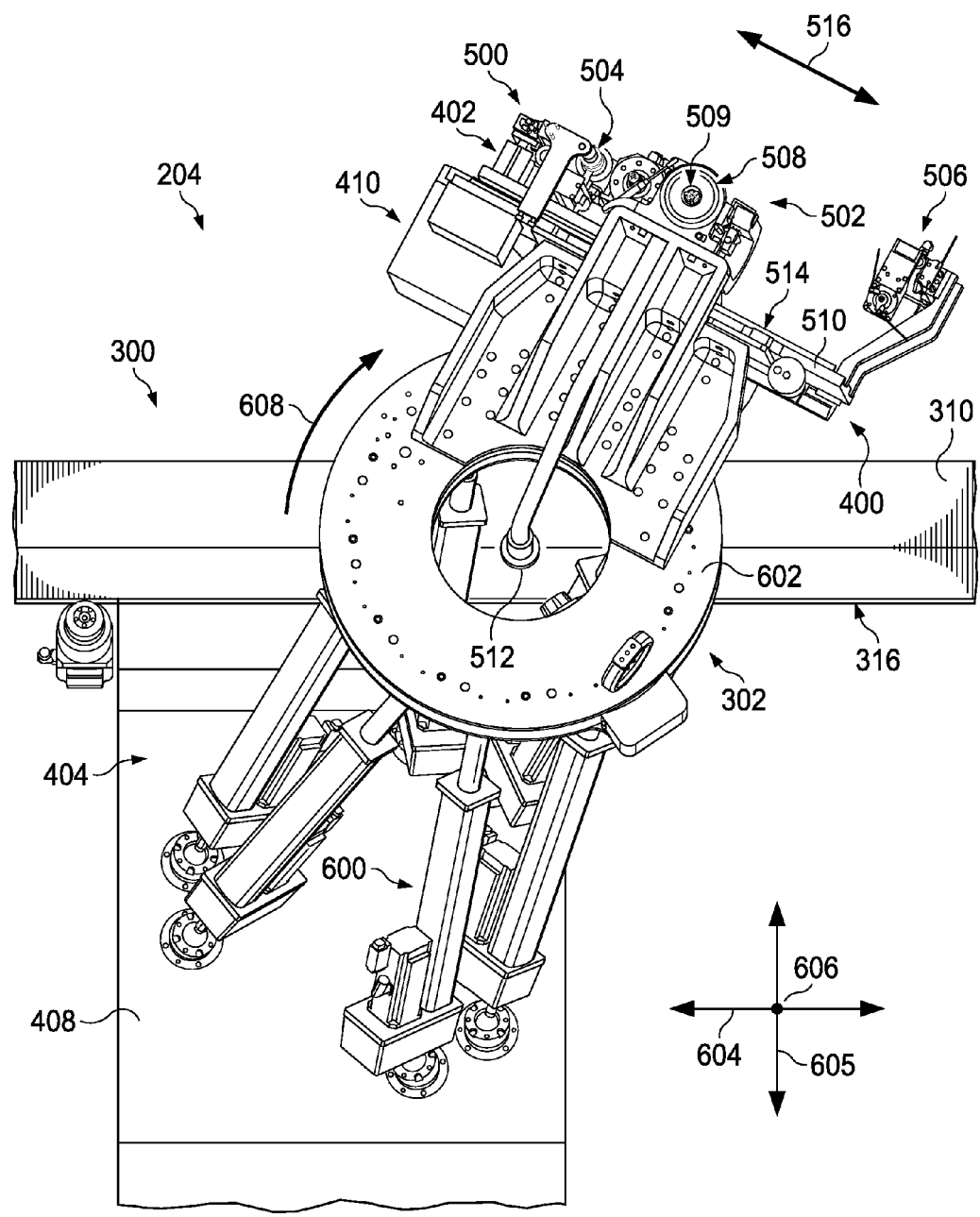
FIG. 6 is an illustration of a bottom view of a hexapod in accordance with an illustrative embodiment.

In FIG. 6, an illustration of a bottom view of hexapod 302 shown in the direction of lines 6-6 in FIG. 4 is depicted in accordance with an illustrative embodiment. In this illustrative example, hexapod 302 may include linear actuators 600 and disc actuator 602. Disc actuator 602 is connected to end effector 400. Motion of linear actuators 600 or disc actuator 602 may result in movement of end effector 400 in this illustrative example.

Linear actuators 600 may be configured to extend and retract individually to move disc actuator 602 with six degrees of freedom in this illustrative example. Specifically, linear actuators 600 may be configured to translate disc actuator 602 in x-axis 604, y-axis 605, and z-axis 606 and rotate disc actuator 602 about x-axis 604, y-axis 605, and z-axis 606.

In this illustrative example, disc actuator 602 may be configured to rotate in the direction of arrow 608 to move end effector 400 about the circumference of disc actuator 602. In this manner, hexapod 302 provides an additional degree of freedom of movement for end effector 400. In other words, linear actuators 600 with disc actuator 602 may provide a total of seven degrees of freedom of movement for end effector 400. Linear actuators 600, disc actuator 602, or both may move individually or simultaneously to place end effector 400 in a desired position relative to work surface 206 of panel 208 shown in FIG. 2.

Figure 7:
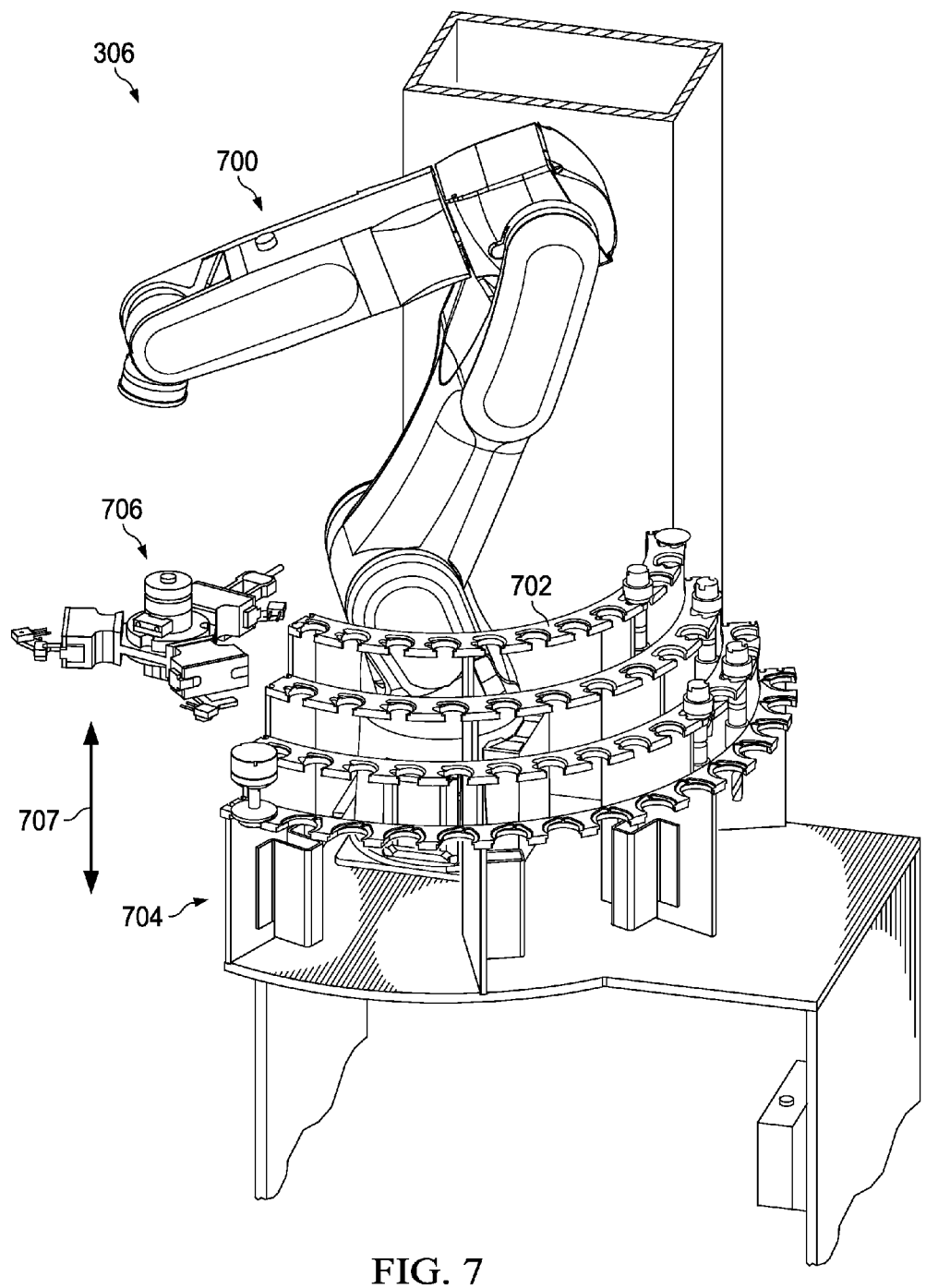
FIG. 7 is an illustration of a tool management system in accordance with an illustrative embodiment.

With reference next to FIG. 7, an illustration of tool management system 306, shown in the direction of lines 7-7 from FIG. 3, is depicted in accordance with an illustrative embodiment. In this example, an enlarged view of tool management system 306 is shown without other components in overhead assembly system 204 shown in FIGS. 2-6 to better show features of tool management system 306.

In this depicted example, tool management system 306 may include a number of components. As depicted, tool management system 306 may include robot arm 700, storage rack 702, and tools 704.

As depicted, robot arm 700 may have end effector 706. End effector 706 is configured to hold a portion of tools 704 to exchange tools 704 with end effector 400 shown in FIG. 4. For instance, end effector 706 may exchange a probe, a drill bit, a removable pressure foot, or other tools with end effector 400, depending on the operations being performed by end effector 400. In some cases, tool management system 306 may move vertically up and down in the direction of arrow 707 to get closer to end effector 400 for the exchange.

In this illustrative example, storage rack 702 also may hold a portion of tools 704. Robot arm 700 may use end effector 706 to drop off a tool in storage rack 702. In a similar fashion, robot arm 700 may use end effector 706 to pick up a tool stored in storage rack 702. In this manner, tool management system 306 may provide various tools 704 for use on panel 208 shown in FIG. 2.

Figure 8:
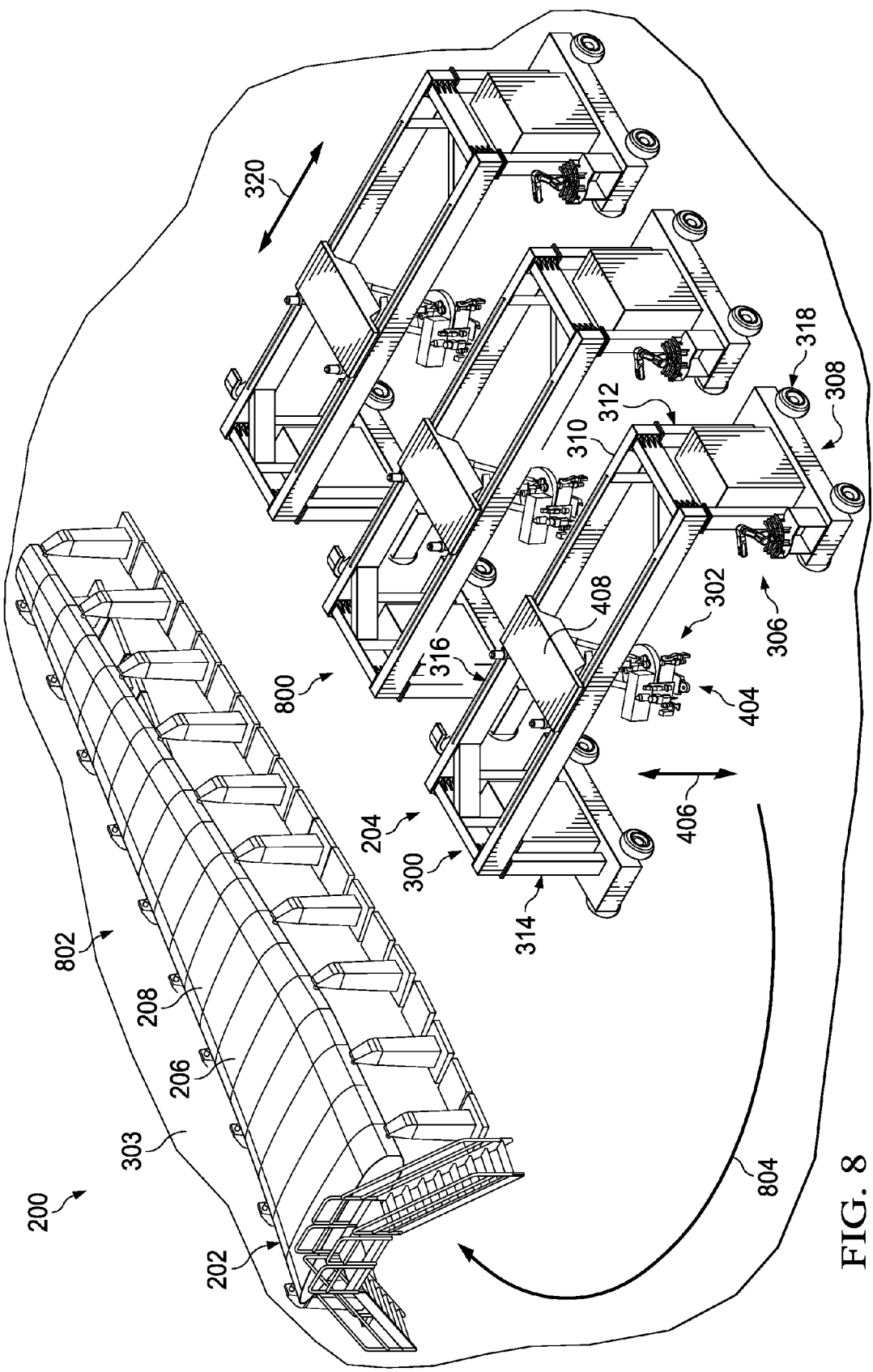
FIGS. 8-16 are illustrations of an overhead assembly system positioning itself and performing operations on a work surface of an upper skin panel in accordance with an illustrative embodiment.
Figure 9:
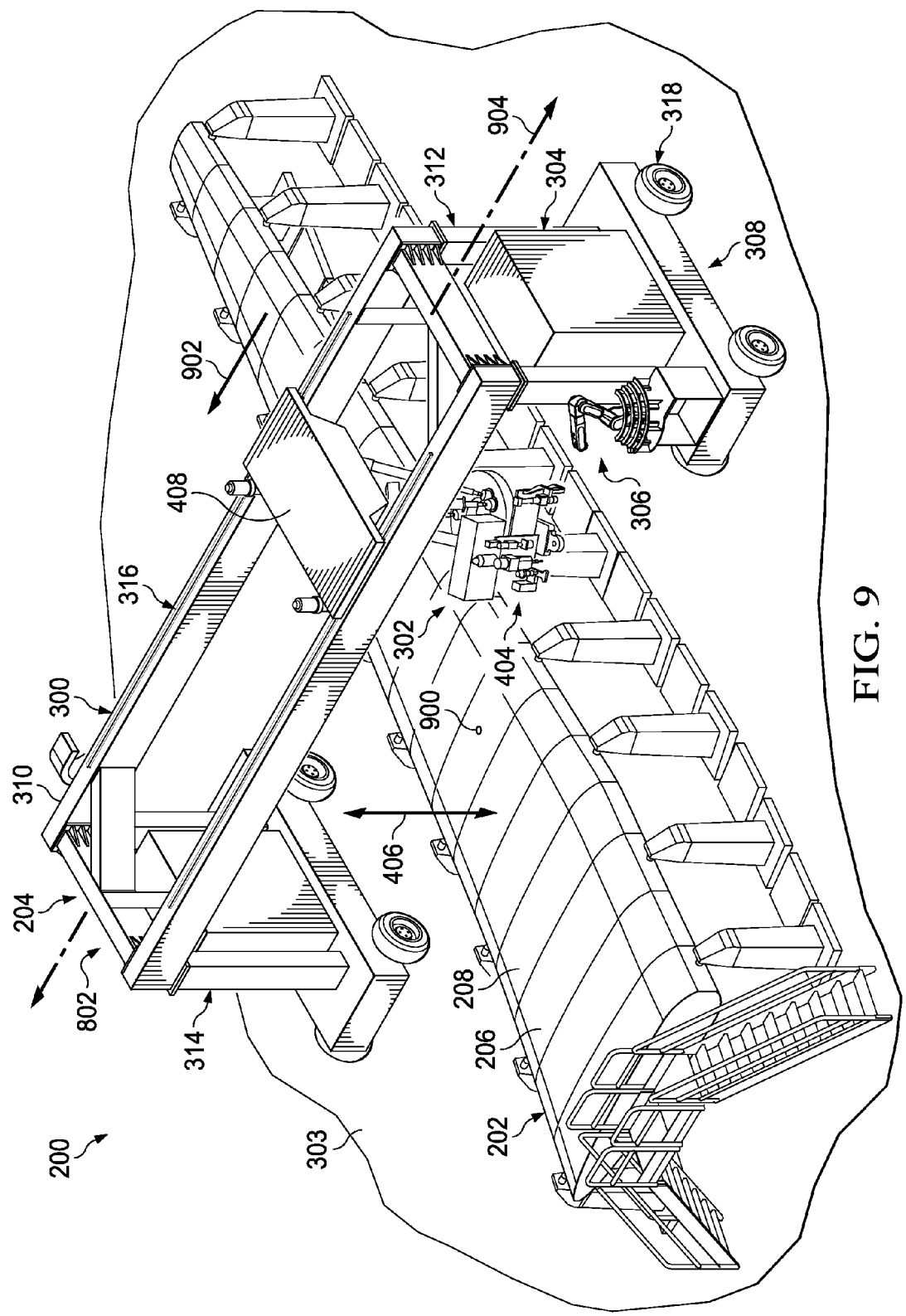
Figure 10:
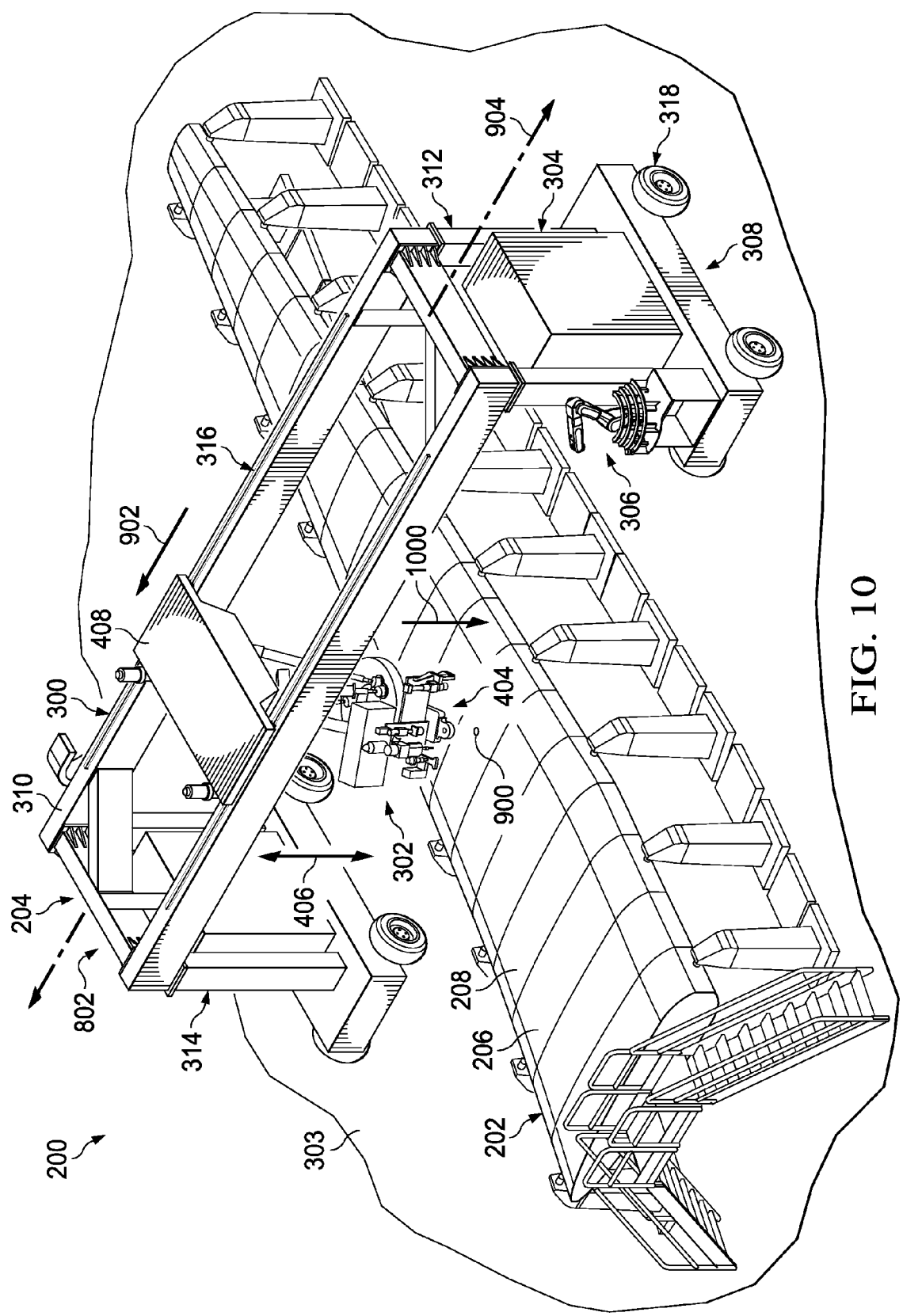

FIGS. 8-16 show illustrations of overhead assembly system 204 positioning itself and performing operations on work surface 206 of panel 208 in accordance with an illustrative embodiment. Specifically, FIGS. 8-10 show the progression of movement of overhead assembly system 204 across floor 303 of manufacturing environment 200 as it roughly positions itself above work surface 206, as shown in FIG. 2. FIGS. 11-16 show hexapod 302 precisely positioning end effector 400 to install a fastener in work surface 206 of panel 208.

Turning to FIG. 8, overhead assembly system 204 may be configured to move from first location 800 to second location 802 in manufacturing environment 200. First location 800 and second location 802 may be examples of implementations for first location 117 and second location 121 shown in block form in FIG. 1.

In this depicted example, overhead assembly system 204 may be currently located in first location 800. First location 800 may be a stowed location in this illustrative example. For instance, overhead assembly system 204 may be stored until needed to perform operations on various structures in manufacturing environment 200.

In other illustrative examples, first location 800 may be a location where overhead assembly system 204 is currently performing operations on another structure within manufacturing environment 200, a location outside of manufacturing environment 200, or some combination thereof. In this manner, overhead assembly system 204 is mobile and reconfigurable within manufacturing environment 200.

As shown, wing assembly 202 is located in second location 802. Overhead assembly system 204 may use first movement system 308 to drive in the direction of arrow 804 across floor 303 of manufacturing environment 200 to roughly position itself relative to work surface 206 of panel 208.

In this illustrative example, overhead assembly system 204 may drive in the direction of arrow 804 such that overhead assembly system 204 avoids undesired encounters with human operators such as human operators, other tools such as autonomous tool systems, and wing assembly 202. A system controller and a metrology system (not shown) may guide overhead assembly system 204 to avoid such undesired encounters. In another illustrative example, controller 128 shown in block form in FIG. 1 may determine the position of overhead assembly system 204 relative to other structures and human operators as well. In still other illustrative examples, overhead assembly system 204 is drivable by a human operator or mechanical system using a tug or other device.

In FIG. 9, overhead assembly system 204 has moved in the direction of arrow 804 from first location 800 to second location 802. Overhead support system 300 with hexapod 302 is now roughly positioned over work surface 206.

In this illustrative example, mecanum wheels 318 have retracted to temporarily plant overhead support system 300 on floor 303. In this manner, overhead support system 300 may not move outside desired tolerances while operations are performed on work surface 206. Hexapod 302 may now precisely position itself relative to work surface 206 to drill a hole (not shown in this view) at location 900 on work surface 206.

In this illustrative example, end effector 400 on hexapod 302 may not be able to reach location 900 on work surface 206 in a desired manner. As a result, hexapod 302 and end effector 400 may be moved in the direction of arrow 902 along longitudinal axis 904 running centrally through gantry beam 310. At least one of the metrology system or sensor system 500, shown in FIG. 5, may determine the position of end effector 400 relative to location 900 of work surface 206.

Referring next to FIG. 10, hexapod 302 has moved in the direction of arrow 902 to be positioned over location 900. Hexapod 302 may now be moved in the direction of arrow 1000 along vertical axis 406 using second movement system 404. Hexapod 302 may be moved in the direction of arrow 1000 to position end effector 400 with set of tools 402 closer to work surface 206 in this illustrative example.

Figure 11:
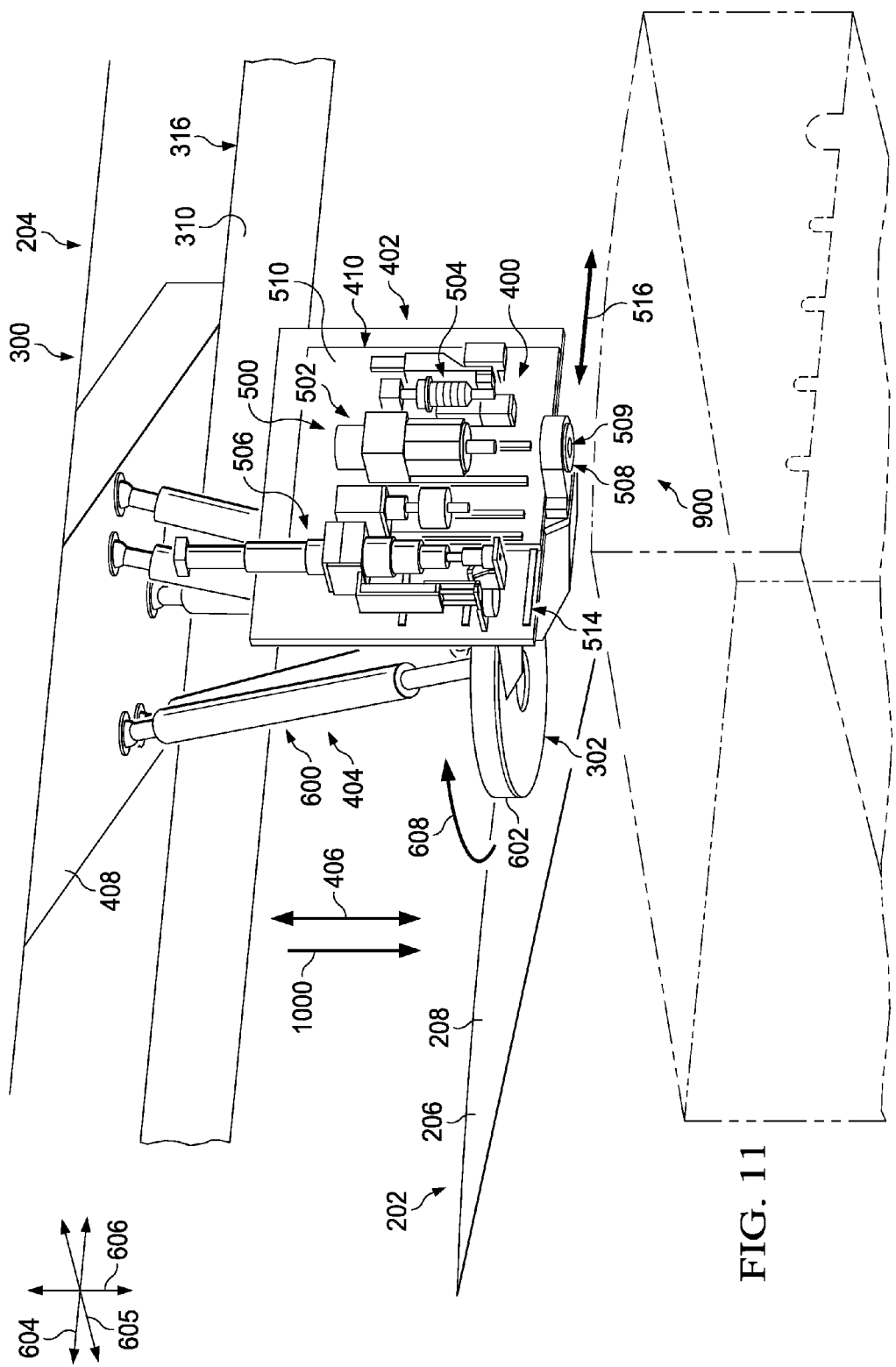

Turning to FIG. 11, hexapod 302 has moved in the direction of arrow 1000. Sensor system 500 may be used to determine location 900 for the hole to be drilled in work surface 206. Hexapod 302 may then precisely position end effector 400 with set of tools 402 perpendicular to location 900 on work surface 206.

In this illustrative example, a portion of linear actuators 600 may be extended to position end effector 400. In addition, disc actuator 602 may rotate end effector 400 in the direction of arrow 608.

As end effector 400 is moved into position, sensor system 500 may continuously measure its position relative to location 900 to precisely position end effector 400. For example, without limitation, sensor system 500 may use index features (not shown) on wing assembly 202 to determine its position relative to work surface 206.

Figure 12:
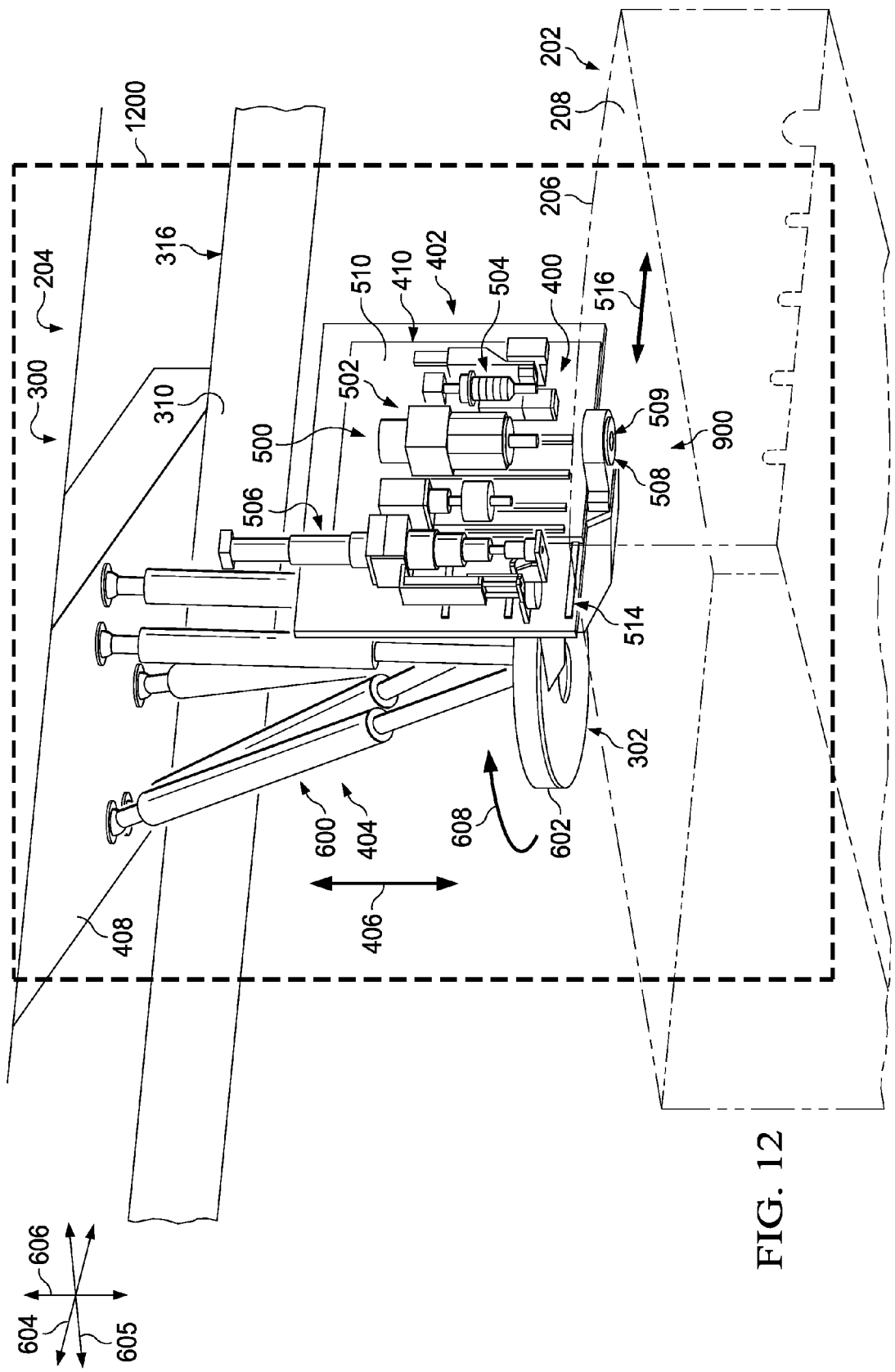

Turing next to FIG. 12, pressure foot 508 may contact work surface 206. Pressure foot 508 may identify a contact force between pressure foot 508 and work surface 206 using a load cell (not shown). Movement of end effector 400 may be slowed in response to the contact until end effector 400 is in a desired position against work surface 206. As an example, a desired amount of contact force may be needed to clamp work surface 206 to a rib or spar within the substructure of wing assembly 202.

In this illustrative example, sensor system 500 may then be used to confirm a desired position for end effector 400 relative to location 900 on work surface 206. Sensor system 500 may confirm that end effector 400 and set of tools 402 are positioned perpendicular to work surface 206 at location 900. Set of tools 402 are shown in section 1200 in this illustrative example. Set of tools 402 may be moved in the direction of arrow 516 on track system 514 to move drilling system 502 into a position to drill the hole.

Figure 13:
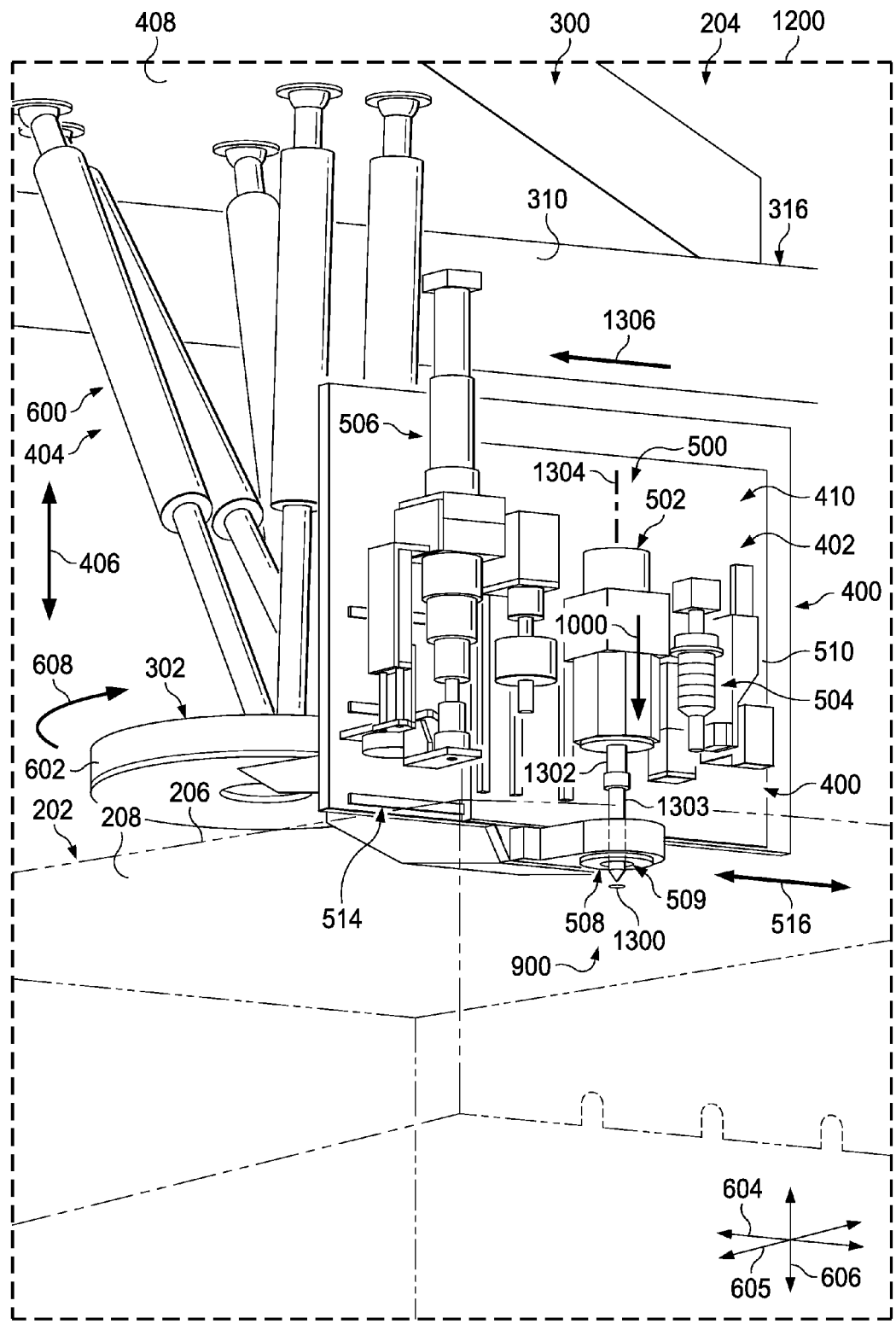

In FIG. 13, drilling system 502 may be used to drill hole 1300 in work surface 206 at location 900. In particular, spindle 1302 with drill bit 1303 may extend in the direction of arrow 1000 along feed axis 1304. Spindle 1302 and feed axis 1304 may be examples of spindle 154 and feed axis 156, respectively, in drilling system 140 shown in FIG. 1.

After drilling hole 1300, spindle 1302 may retract upward to its previous position. Set of tools 402 may then move in the direction of arrow 1306 along track system 514 into a position to inspect hole 1300.

Figure 14:
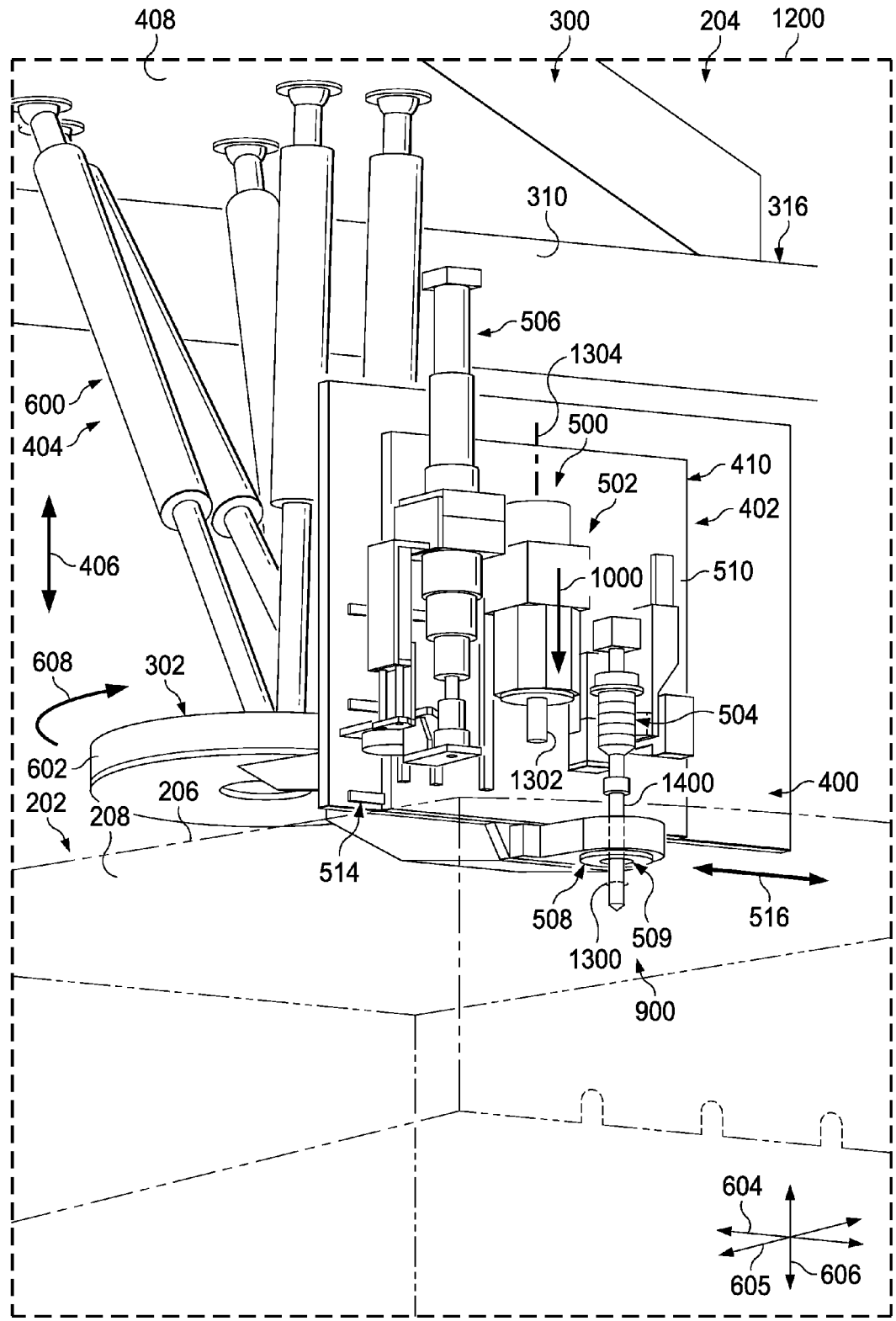

With reference to FIG. 14, inspection system 504 may be extended in the direction of arrow 1000 to inspect hole 1300. In this illustrative example, hole probe 1400 may be used to measure a diameter of hole 1300. Hole probe 1400 may be an example of hole probe 160 shown in block form in FIG. 1.

After inspection of hole 1300, hole probe 1400 retracts upward to its previous position. A fastener (not shown in this view) may then be installed in hole 1300. End effector 400 and set of tools 402 may move to position fastener installer 506 relative to hole 1300.

Figure 15:
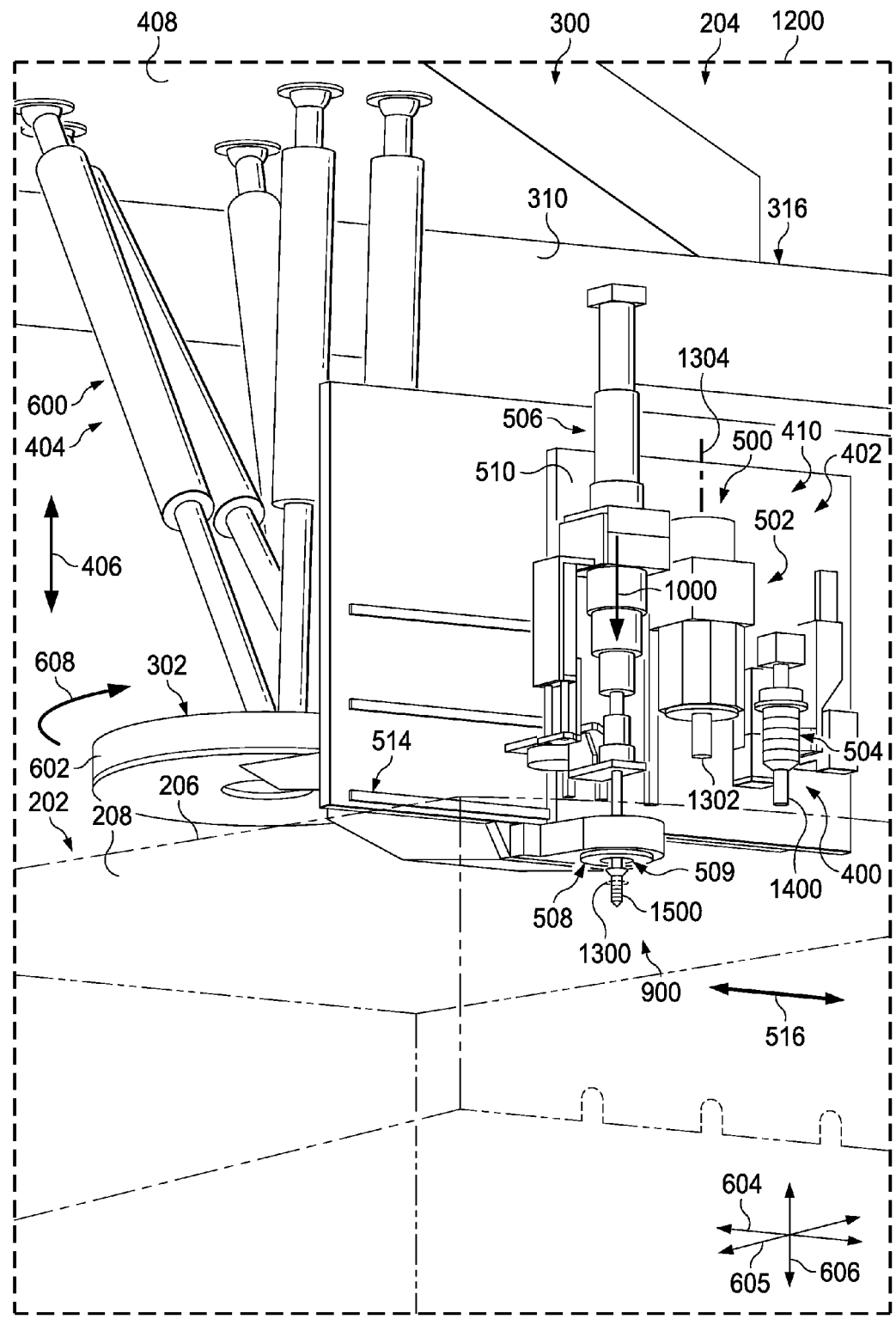

In FIG. 15, fastener installer 506 may insert fastener 1500 into hole 1300. Fastener installer 506 may move from side to side using track system 514 and then extend vertically in the direction of arrow 1000 to insert fastener 1500 in hole 1300.

Figure 16:
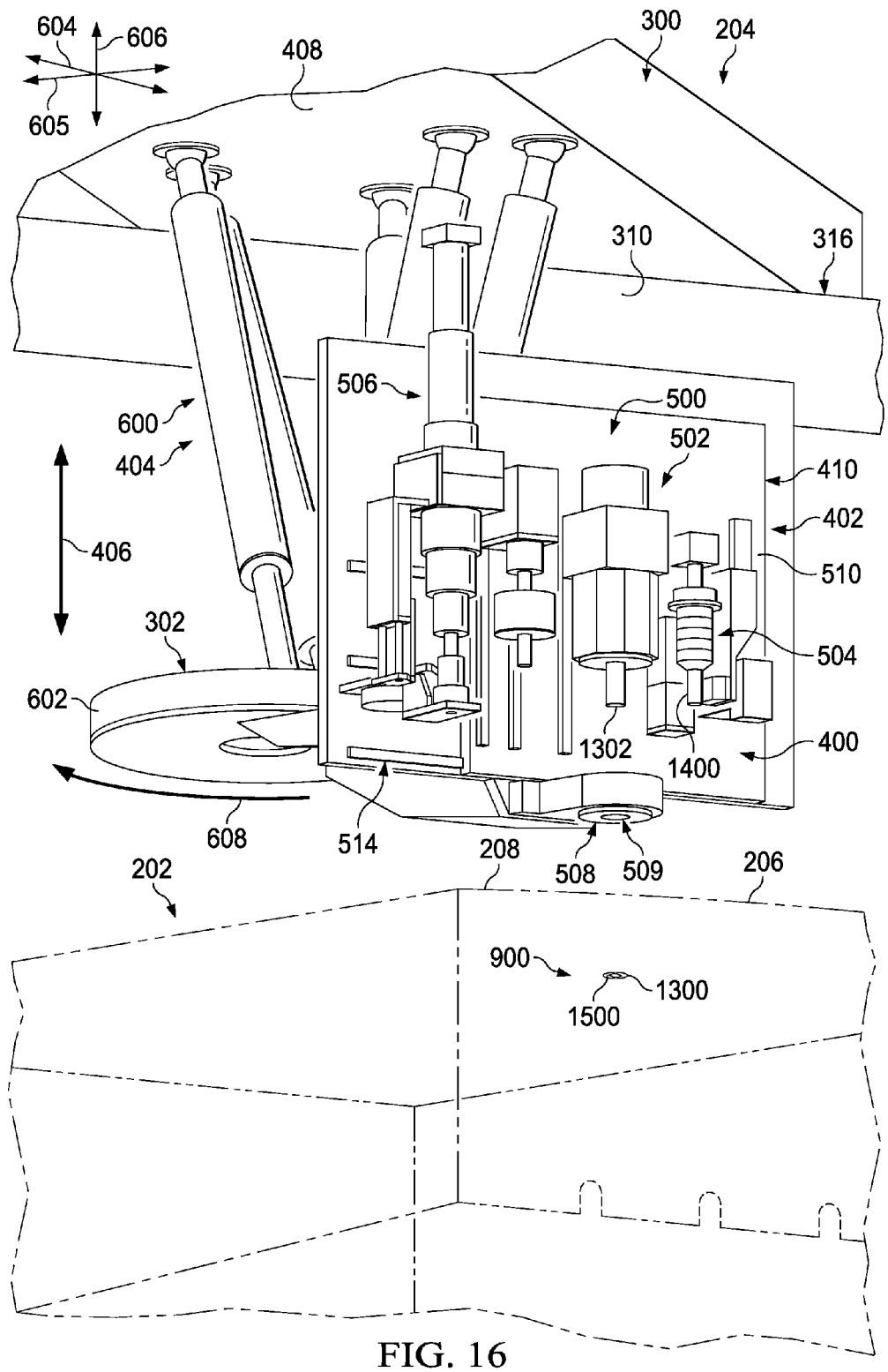

Referring now to FIG. 16, fastener installer 506 has installed fastener 1500 into hole 1300. End effector 400 may now be repositioned relative to a next location to drill a hole. Movement of end effector 400 may occur in the manner described above. At least one of first movement system 308, second movement system 404, or hexapod 302 may be used to position end effector 400 as desired.

In this illustrative example, overhead assembly system 204 may be configured to provide "one-up assembly" of fasteners in panel 208. In this illustrative example, "one-up" assembly may refer to the process of drilling and fastening joints without having to drill holes, to disassemble parts for cleaning and/or deburring before reassembling to install fasteners. This one up assembly may increase the rate at which fasteners may be installed in panel 208 and also may increase wing assembly rates.

In other illustrative examples, overhead assembly system 204 may not install fastener 1500. Instead, overhead assembly system 204 may drill holes in work surface 206 and inspect those holes, but not install the fasteners. Overhead assembly system 204, a human operation, or some other type of device may subsequently install the fasteners in the holes.

In yet another illustrative example, overhead assembly system 204 may be used in a non-one up assembly situation. For instance, overhead assembly system 204 may drill hole 1300 and inspect the diameter of hole 1300, before being moved away from panel 208. Panel 208 may then be lowered, cleaned, deburred, and reinstalled. Overhead assembly system 204 then may be brought back into place for fastener insertion operations.

Figure 17:
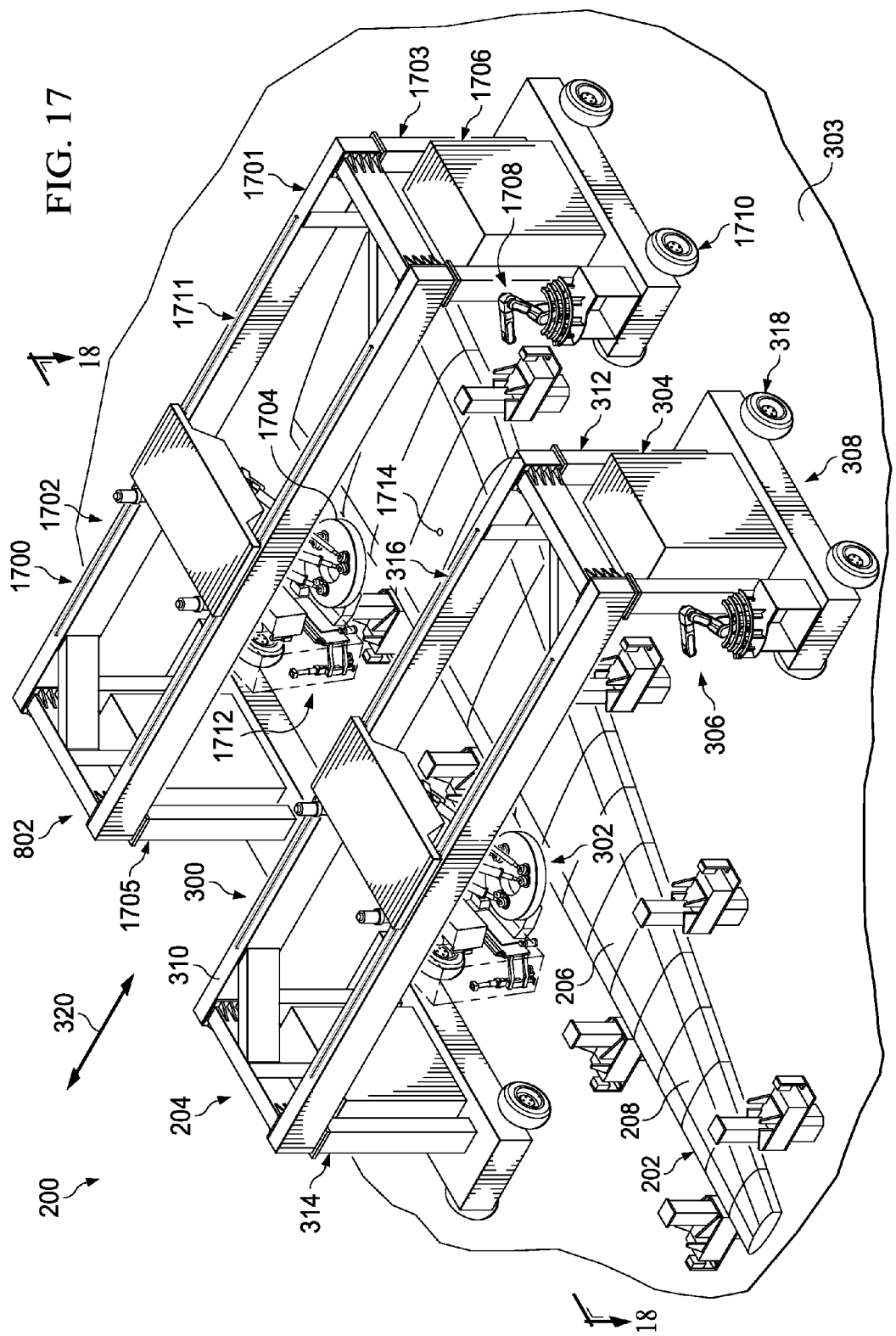
FIG. 17 is an illustration of a manufacturing environment with two overhead assembly systems in accordance with an illustrative embodiment.

FIGS. 8-16 show fixed supports holding panel 208, while FIG. 17 illustrates drivable supports holding panel 208. Overhead assembly system 204 may be used with either type of support to perform operations on panel 208.

Referring now to FIG. 17, an illustration of manufacturing environment 200 with two overhead assembly systems is depicted in accordance with an illustrative embodiment. In this illustrative example, overhead assembly system 1700 has been positioned adjacent to overhead assembly system 204.

Overhead assembly system 1700 may be an example of another physical implementation for overhead assembly system 102 shown in block form in FIG. 1. In an illustrative example, overhead assembly system 1700 and overhead assembly system 204 may perform operations simultaneously on work surface 206.

As shown in this view, overhead assembly system 1700 may have similar components to overhead assembly system 204, shown and described with reference to FIGS. 3-7. In particular, overhead assembly system 1700 may include overhead support system 1702 with gantry beam 1701, vertical support structure 1703, vertical support structure 1705, hexapod 1704, controller 1706, tool management system 1708, first movement system 1710, and overhead track system 1711. Overhead support system 1702, gantry beam 1701, vertical support structure 1703, vertical support structure 1705, hexapod 1704, controller 1706, tool management system 1708, and first movement system 1710 may be examples of physical implementations for overhead support system 118, hexapod 141, controller 128, tool management system 126, and first movement system 119, respectively, shown in block form in FIG. 1.

In this depicted example, hexapod 1704 may include end effector 1712 to perform operations on work surface 206. End effector 1712 may be another example of an implementation for end effector 120 shown in FIG. 1.

Similar to the process described in FIGS. 10-15 with respect to end effector 400, end effector 1712 is precisely positioned relative to location 1714 on work surface 206. Both end effector 400 and end effector 1712 may work simultaneously to drill holes, install fasteners, inspect those fasteners, and perform other operations on work surface 206.

Figure 18:
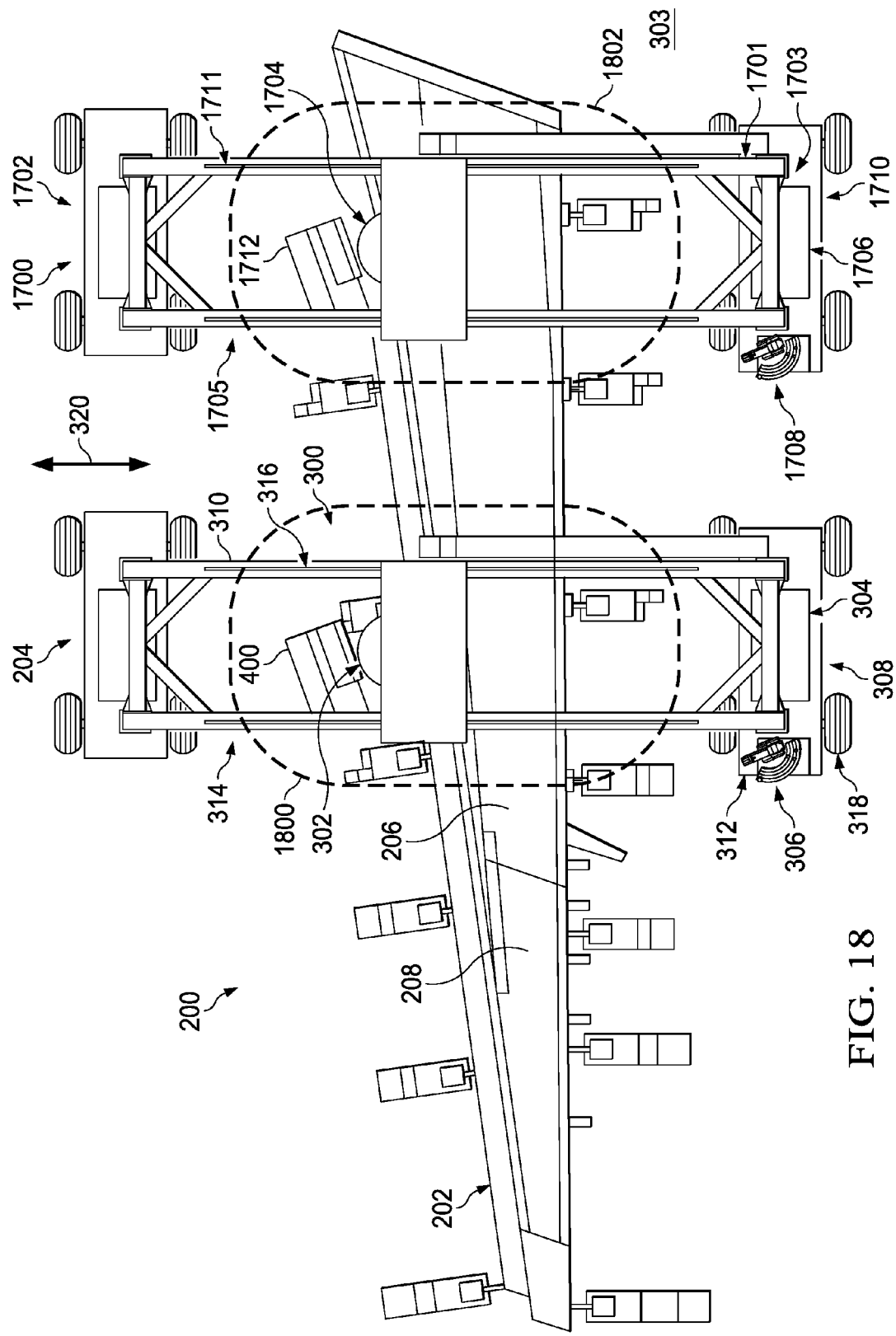
FIG. 18 is an illustration of a top view of two overhead assembly systems working in tandem on a work surface of a panel in accordance with an illustrative embodiment.

FIG. 18 shows an illustration of a top view of overhead assembly system 204 and overhead assembly system 1700 working in tandem on work surface 206 of panel 208. This view is shown in the direction of lines 18-18 in FIG. 17.

As depicted, overhead assembly system 204 may have work zone 1800, while overhead assembly system 1700 may have work zone 1802. A "work zone" may represent the reach of each respective end effector when its corresponding overhead support system is temporarily planted in place. In other illustrative examples, a work zone also may be referred to as a work envelope or work volume.

In this depicted example, work zone 1800 and work zone 1802 do not overlap. In this manner, the risk of undesired encounters between end effector 400 and end effector 1712 are reduced or eliminated.

Additionally, as shown in this view, each end effector has access to a large portion of work surface 206. Specifically, each end effector may quickly move about its respective work zone to perform operations on panel 208.

FIG. 19-24 show illustrations of alternative embodiments for overhead assembly systems in accordance with an illustrative embodiment. Each of the embodiments shown in FIGS. 19-24 may be used in addition to or in place of overhead assembly system 204 and overhead assembly system 1700 shown in FIGS. 17-18.

Figure 19:
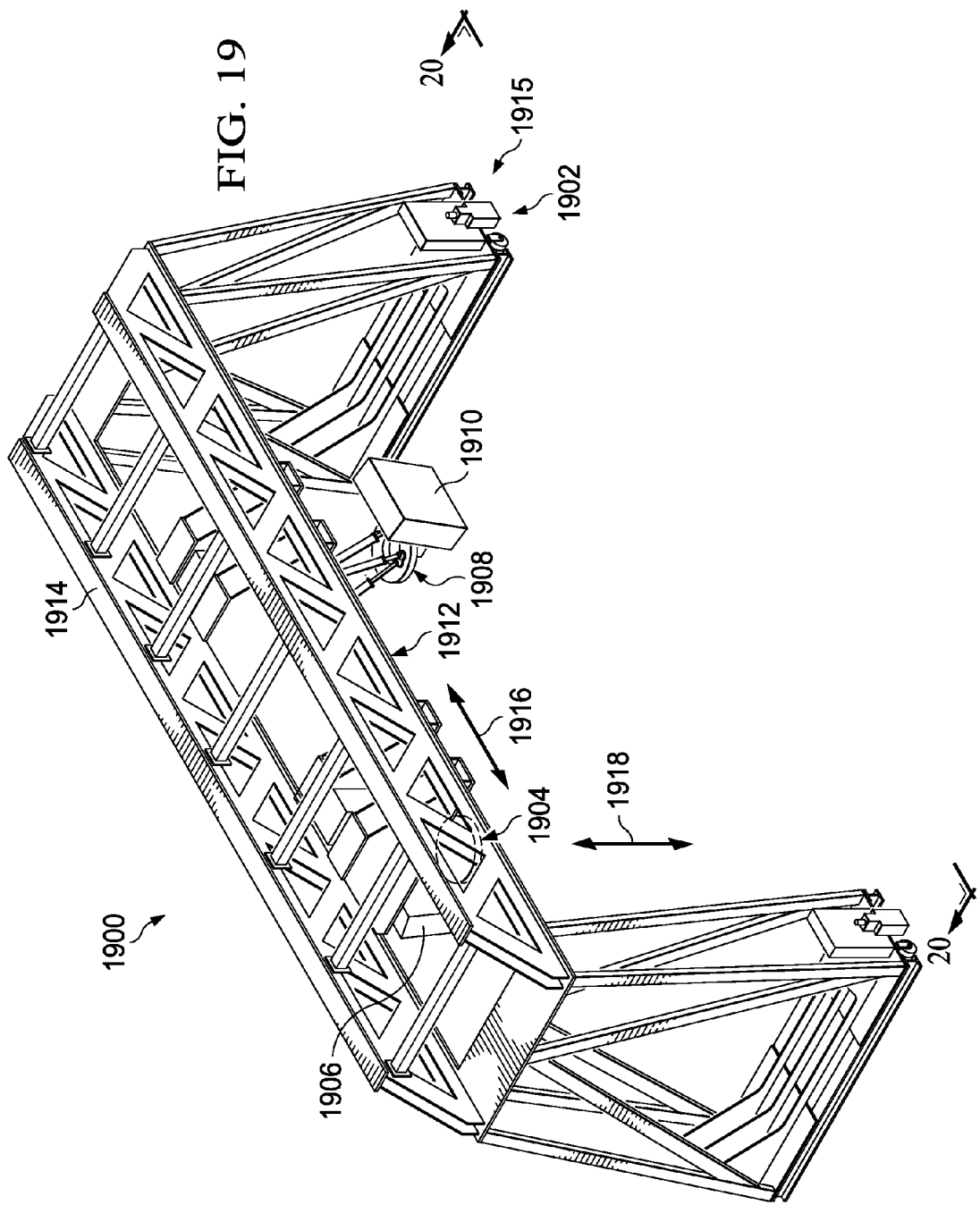
FIGS. 19-24 are illustrations of alternative embodiments for overhead assembly systems in accordance with an illustrative embodiment.

With reference to FIG. 19, overhead assembly system 1900 may include movement system 1902, hexapod 1904 with end effector 1906, hexapod 1908 with end effector 1910, and overhead track system 1912 on split beam 1914. Overhead assembly system 1900 may be an example of overhead assembly system 102, while hexapod 1904 and hexapod 1908 may be examples of hexapod 141 in FIG. 1. End effector 1906 and end effector 1910 may be examples of end effector 120, and overhead track system 1912 on split beam 1914 may be examples of overhead track system 176 and gantry beam 125 in FIG. 1. Movement system 1902 may be an example of first movement system 119 in FIG. 1.

As depicted, movement system 1902 may include casters 1915. In this case, casters 1915 are not retractable.

As shown, hexapod 1904 and hexapod 1908 move in the direction of arrow 1916 along overhead track system 1912. In this illustrative example, overhead track system 1912 is oriented on the lower portion of split beam 1914. Hexapod 1904 and hexapod 1908 also may move vertically in the direction of arrow 1918 to reach a work surface (not shown) as needed.

Coordinated control using a controller (not shown) may be implemented to avoid undesired encounters between hexapods and end effectors. With the use of overhead assembly system 1900 having two hexapods and two end effectors, fasteners may be installed in a work surface at a high rate.

Figure 20:
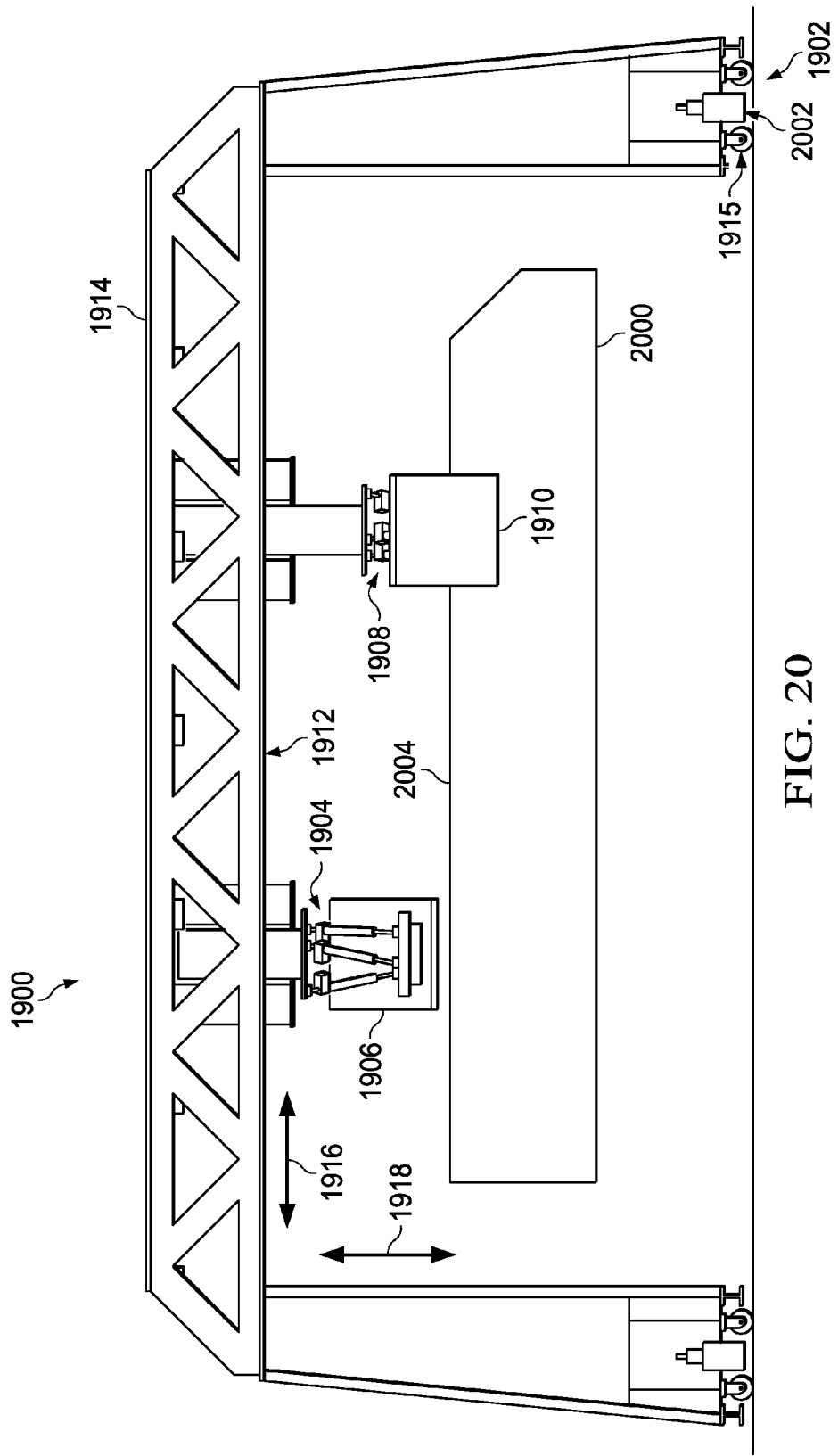

Turning next to FIG. 20, an illustration of a front view of overhead assembly system 1900 shown in the direction of lines 20-20 in FIG. 19 is depicted in accordance with an illustrative embodiment. In this depicted example, overhead assembly system 1900 has been positioned above structure 2000. Structure 2000 may be an example of a physical implementation for structure 106 shown in block form in FIG. 1.

Once overhead assembly system 1900 is roughly positioned over structure 2000 using casters 1915, floor locks 2002 may be used to temporarily plant overhead assembly system 1900 in place. For instance, floor locks 2002 may prevent casters 1915 from moving while operations are performed on structure 2000. Using at least one of end effector 1906 or end effector 1910, overhead assembly system 1900 may perform various operations on work surface 2004 of structure 2000.

Figure 21:
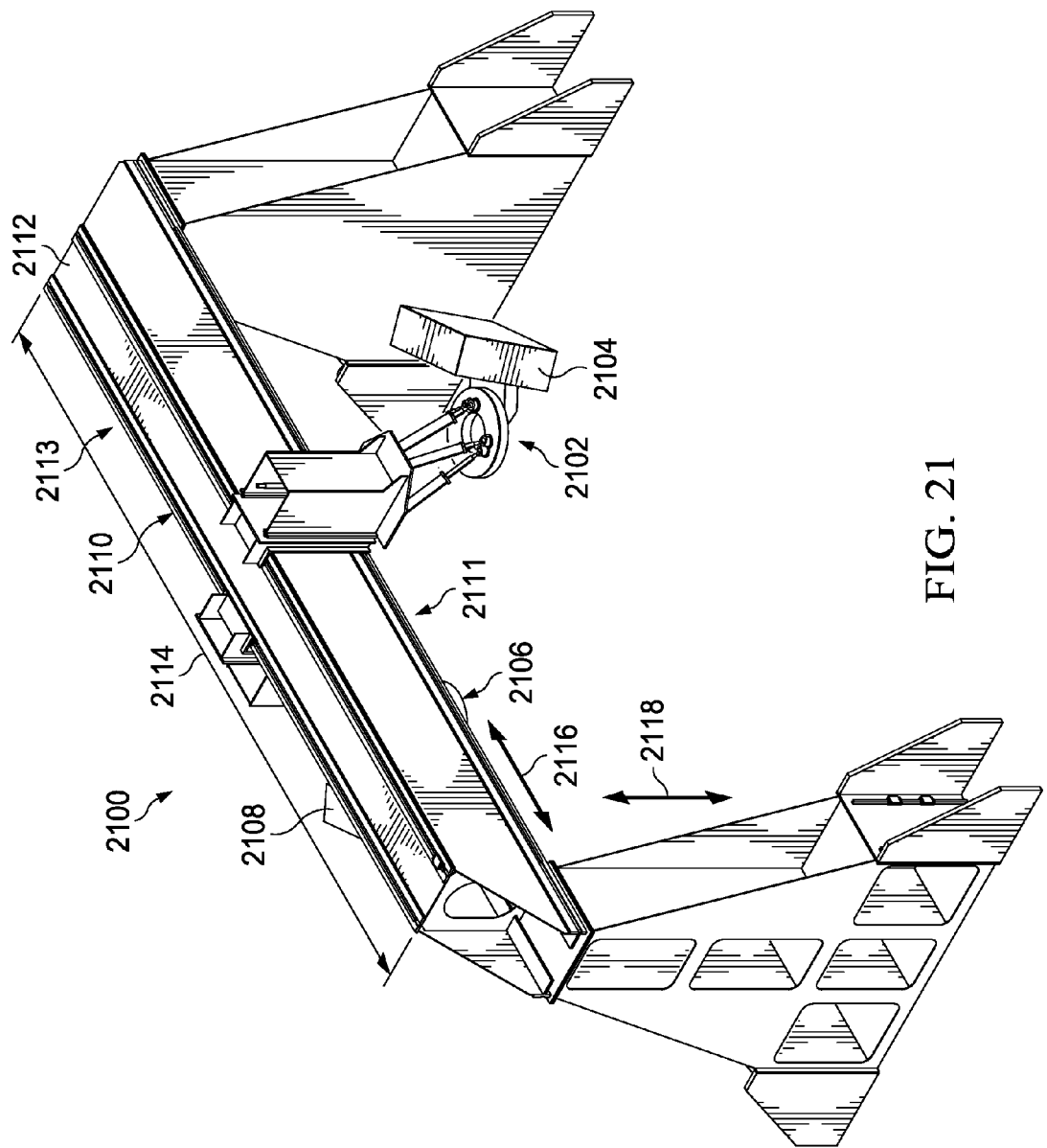

In FIG. 21, overhead assembly system 2100 may include hexapod 2102 with end effector 2104, hexapod 2106 with end effector 2108, and overhead track system 2110 on beam 2112. Overhead assembly system 2100 may be an example of overhead assembly system 102, while hexapod 2102 and hexapod 2106 may be examples of hexapod 141 in FIG. 1. End effector 2104 and end effector 2108 may be examples of end effector 120, and overhead track system 2110 on beam 2112 may be examples of overhead track system 176 and gantry beam 125 in FIG. 1.

As shown, overhead track system 2110 may be positioned on beam 2112. Overhead track system 2110 may include tracks 2111 and tracks 2113 located on opposite sides of beam 2112. In this manner, both hexapod 2102 and hexapod 2106 may move along the entire length 2114 of beam 2112 back and forth in the direction of arrow 2116. Hexapod 2102 and hexapod 2106 may move simultaneously along the entire length 2114 of beam 2112 without colliding with one another on overhead track system 2110. Both hexapod 2102 and hexapod 2106 also may be moved vertically in the direction of arrow 2118 toward a work surface. Coordinated control using a controller (not shown) may be used to avoid undesired encounters between end effector 2104 and 2108 in each respective work zone.

Figure 22:
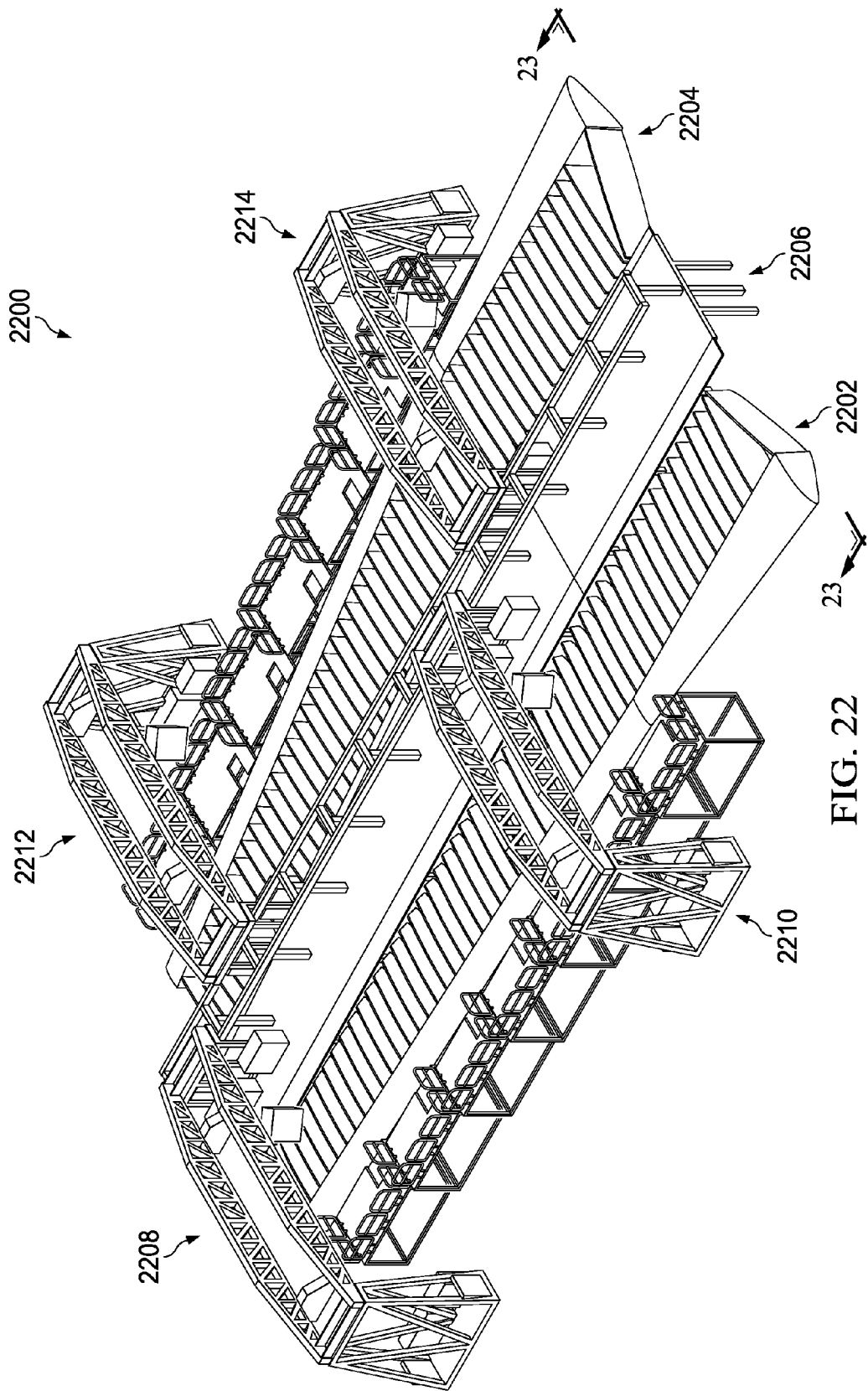

Referring to FIG. 22, an illustration of an overhead assembly system is depicted in accordance with an illustrative embodiment. In this depicted example, overhead assembly system 2200 is used to assemble structure 2202 and structure 2204 substantially concurrently. Structure 2202 and structure 2204 each take the form of a wing assembly in this illustrative example.

As shown, central platform 2206 may be positioned between structure 2202 and structure 2204 and hold a portion of both structures. Overhead support system 2208, overhead support system 2210, overhead support system 2212, and overhead support system 2214 may be connected to central platform 2206 in some manner. In some cases, each of these overhead support systems may be examples of implementations for overhead support system 118 shown in block form in FIG. 1.

Overhead support system 2208, overhead support system 2210, overhead support system 2212, and overhead support system 2214 are moveable and carry at least one hexapod in this illustrative example. Each of these systems may work simultaneously to perform various assembly operations on either structure 2202 or structure 2204.

When work is completed, each of the overhead support systems may be moved individually. In other illustrative examples, the entirety of overhead assembly system 2200 may be moved together. In this manner, central platform 2206, overhead support system 2208, overhead support system 2210, overhead support system 2212, and overhead support system 2214 may be moved from one location to another location at the same time.

Figure 23:
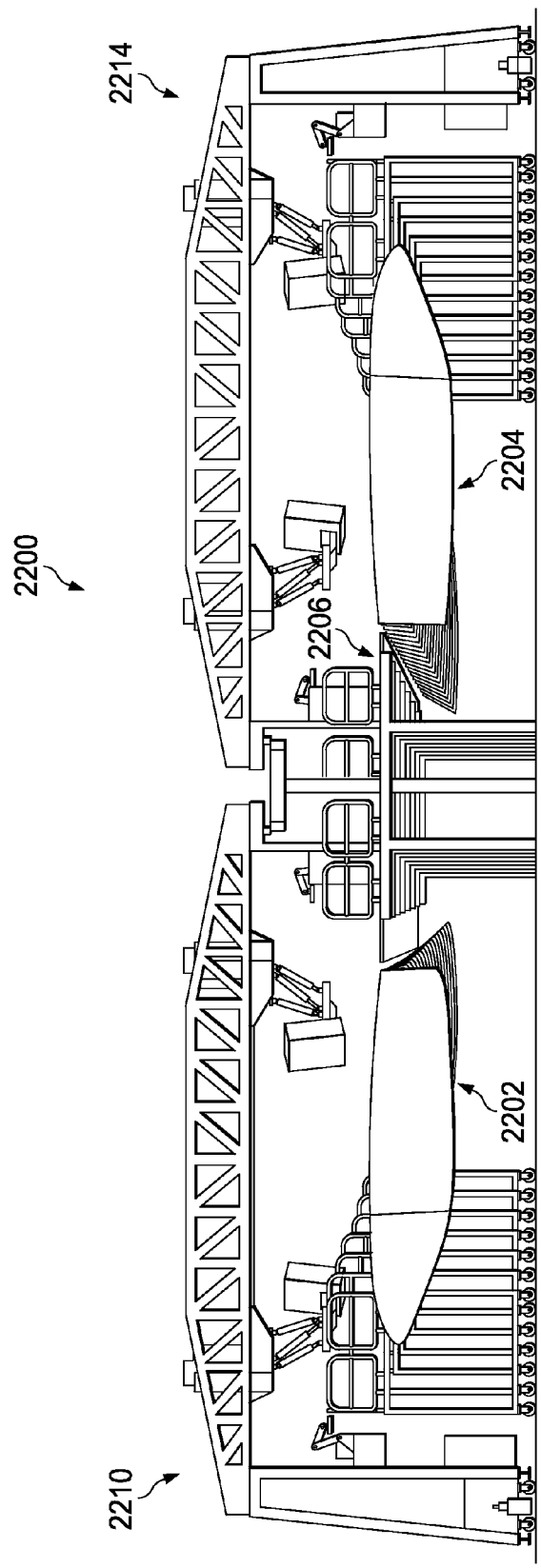

FIG. 23 shows an illustration of overhead assembly system 2200 in the direction of lines 23-23 in FIG. 22. The components within overhead assembly system 2200 are shown performing operations on structure 2202 and structure 2204 under the coordinated control of a system controller (not shown). Each individual controller associated with an overhead support system may communicate with other controllers in overhead assembly system 2200 to operate as desired.

Figure 24:
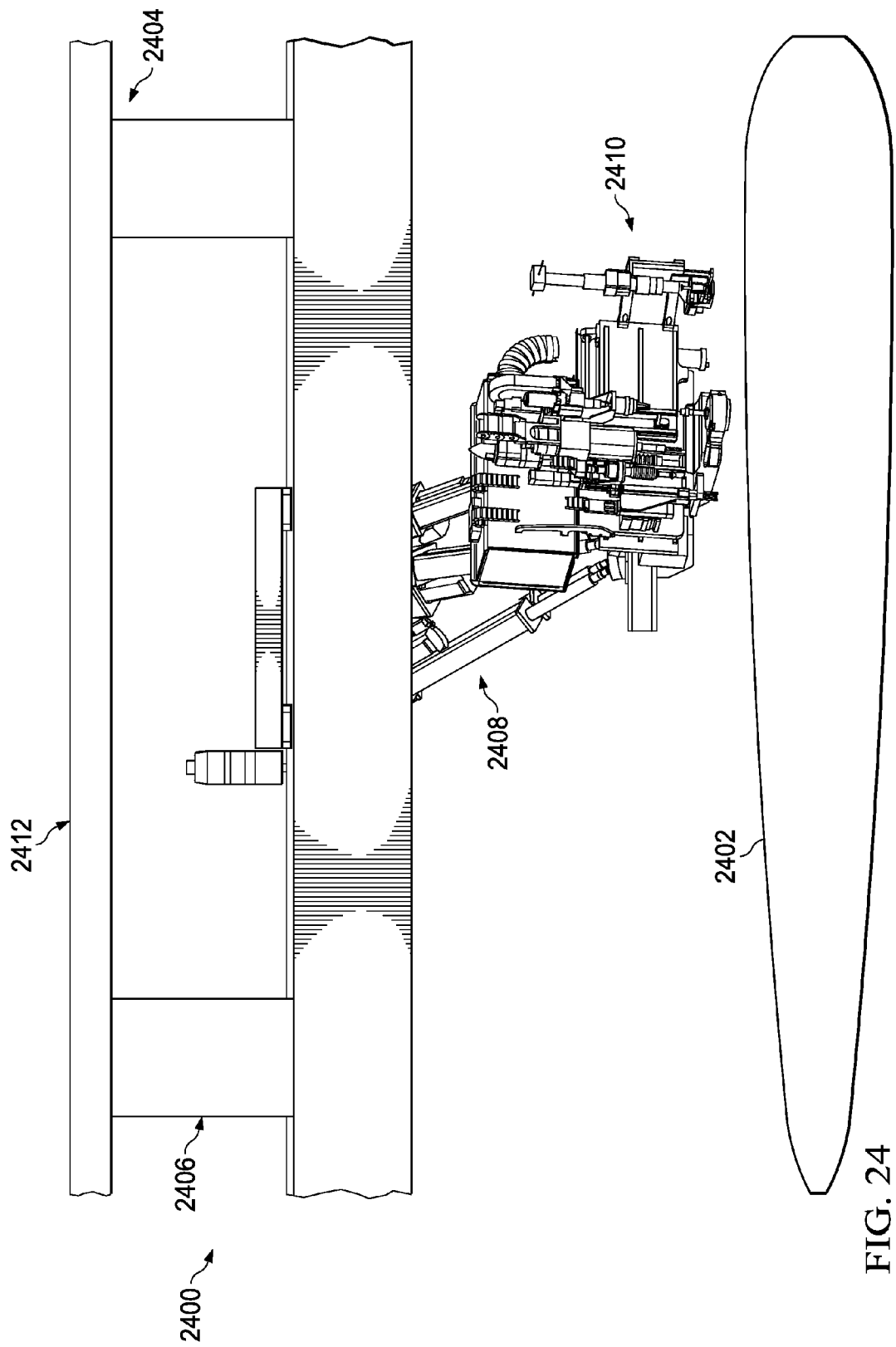

With reference to FIG. 24, an illustration of an overhead assembly system is depicted in accordance with an illustrative embodiment. In this depicted example, overhead assembly system 2400 may be positioned above structure 2402. Overhead assembly system 2400 may include movement system 2404, overhead support system 2406, and hexapod 2408 with end effector 2410. Overhead assembly system 2400, movement system 2404, overhead support system 2406, hexapod 2408, and end effector 2410 may be examples of implementations for overhead assembly system 102, first movement system 119, overhead support system 118, hexapod 141, and end effector 120 shown in block form in FIG. 1.

In this illustrative example, overhead support system 2406 may be mounted to ceiling 2412 in manufacturing environment 210 in FIG. 2. Ceiling 2412 may be an example of ceiling 109 shown in FIG. 1. Depending on the particular implementation, overhead support system 2406 may carry hexapod 2408 to different locations relative to ceiling 2412 using movement system 2404 to roughly position hexapod 2408 above structure 2402 as desired. Precise positioning of hexapod 2408, end effector 2410, or both is completed as described above.

The illustrations of the various overhead assembly systems shown in FIGS. 2-24 are not meant to imply physical or architectural limitations to the manner in which an illustrative embodiment may be implemented. Other components in addition to or in place of the ones illustrated may be used. Some components may be optional.

The different components shown in FIGS. 2-24 may be illustrative examples of how components shown in block form in FIG. 1 can be implemented as physical structures. Additionally, some of the components in FIGS. 2-24 may be combined with components in FIG. 1, used with components in FIG. 1, or a combination of the two.

For example, without limitation, the illustrative embodiments may be used with various configurations of structures that hold wing assembly 202. As shown in FIGS. 8-10, overhead assembly system 204 may be used with immobile or semi-mobile fixtures where there is access from above. Alternatively, as shown in FIG. 17, for example, overhead assembly system 204 may be arranged above drivable supports configured to hold wing assembly 202. These drivable supports may take the form of automated guided vehicles. In this manner, overhead assembly system 204 is versatile in its use within manufacturing environment 200.

Figure 25:
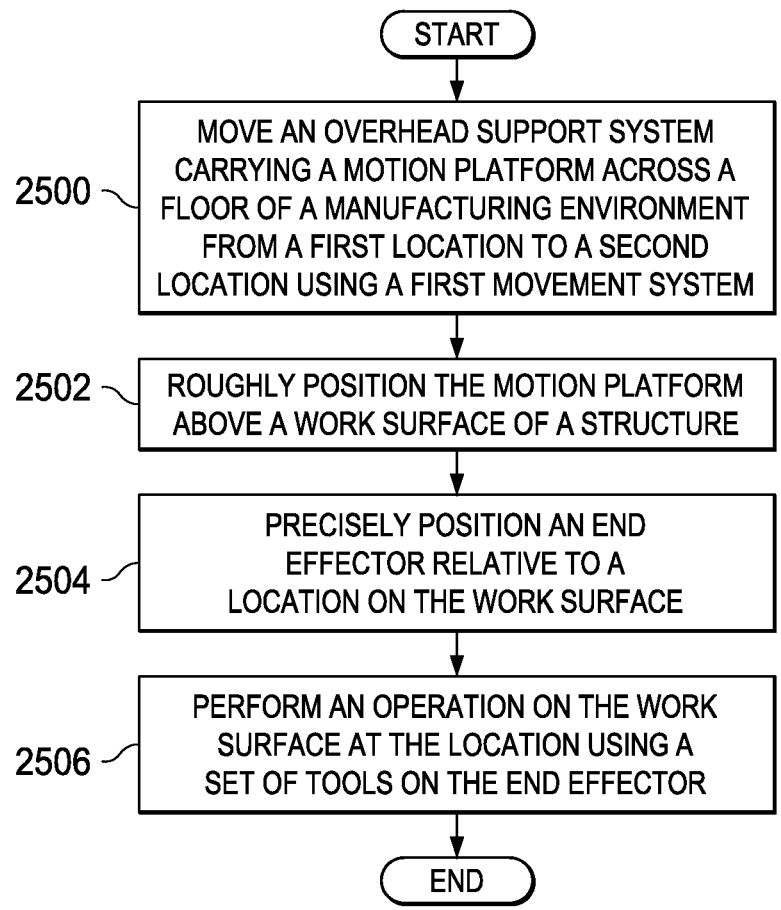
FIG. 25 is an illustration of a flowchart of a process for positioning an overhead assembly system relative to a structure to perform an operation in accordance with an illustrative embodiment.

With reference now to FIG. 25, an illustration of a flowchart of a process for positioning overhead assembly system 102 relative to structure 106 to perform operation 111 from FIG. 1 is depicted in accordance with an illustrative embodiment. In particular, the process illustrated in FIG. 25 may be implemented to install fastener 104 in work surface 116 of panel 112. Control of the different operations may be performed by controller 128 in overhead assembly system 102.

The process may begin by moving overhead support system 118 carrying motion platform 122 across floor 107 of manufacturing environment 100 from first location 117 to second location 121 using first movement system 119 (operation 2500). Next, the process may roughly position motion platform 122 above work surface 116 of structure 106 (operation 2502).

Thereafter, the process precisely positions end effector 120 relative to location 135 on work surface 116 (operation 2404). The process then performs operation 111 on work surface 116 at location 135 using set of tools 132 on end effector 120 (operation 2506), with the process terminating thereafter.

Figure 26:
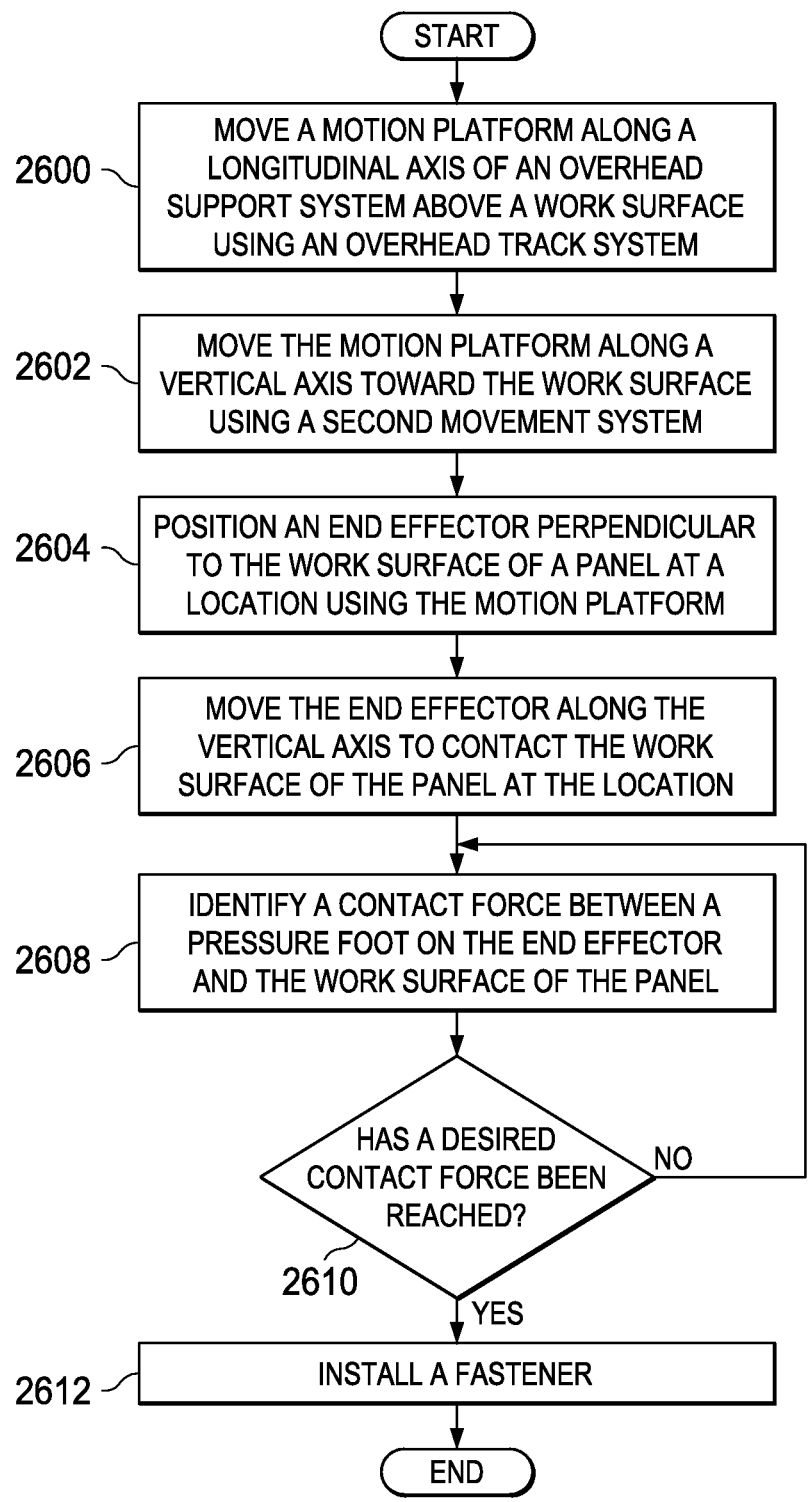
FIG. 26 is a more detailed illustration of a flowchart of a process for positioning an overhead assembly system to perform an operation in accordance with an illustrative embodiment.

Turning next to FIG. 26, a more detailed illustration of a flowchart of a process for positioning overhead assembly system 102 to perform operation 111 in FIG. 1 is depicted in accordance with an illustrative embodiment. The process illustrated in this figure may be implemented after overhead support system 118 has reached second location 121.

The process may begin by moving motion platform 122 along longitudinal axis 178 of overhead support system 118 above work surface 116 using overhead track system 176 (operation 2600). Next, the process may move motion platform 122 along vertical axis 136 toward work surface 116 using second movement system 124 (operation 2602).

The process may position end effector 120 perpendicular to work surface 116 of panel 112 at location 135 using motion platform 122 (operation 2604). In operation 2604, sensor system 138 may identify a position of end effector 120 and compare that position to a desired position for end effector 120. End effector 120 may then be moved using a combination of components in motion platform 122.

Next, the process may move end effector 120 along vertical axis 136 to contact work surface 116 of panel 112 at location 135 (operation 2606). The process identifies contact force 153 between pressure foot 151 on end effector 120 and work surface 116 of panel 112 (operation 2608).

In this illustrative example, contact force 153 may be identified using a load cell or other load-sensing device. Contact force 153 may be identified to reduce undesired encounters between end effector 120 and work surface 116, to determine whether desired contact force 153 has been reached, or both.

A determination may be made as to whether desired contact force 153 has been reached (operation 2610). The desired contact force 153 provides clamping force for panel 112 and its substructure. In some cases, no clamping force is necessary. Controller 128 may compare contact force 153 identified by the load cell to a pre-determined contact force.

If desired contact force 153 has been reached, the process installs fastener 104 (operation 2612) with the process terminating thereafter. Otherwise, if desired contact force 153 has not been reached between work surface 116 and end effector 120, the process returns to operation 2608 as described above.

Figure 27:
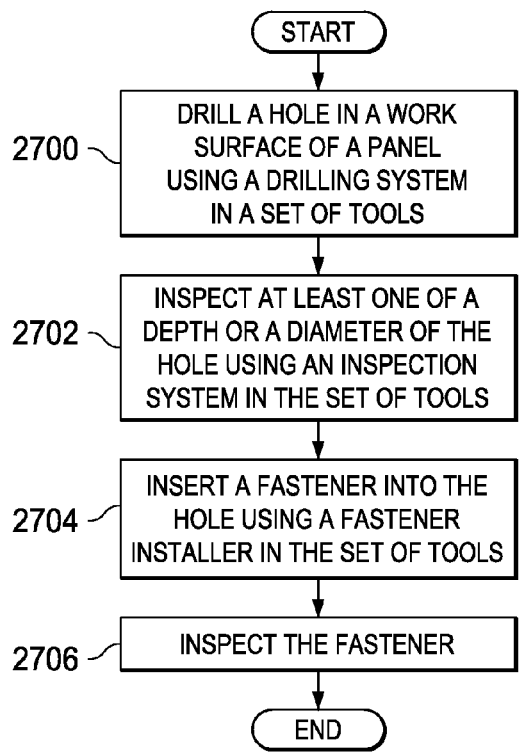
FIG. 27 is an illustration of a flowchart of a process for installing a fastener in a work surface of a panel in accordance with an illustrative embodiment.

Referring next to FIG. 27, an illustration of a flowchart of a process for installing fastener 104 in work surface 116 of panel 112 in FIG. 1 is depicted in accordance with an illustrative embodiment. The process illustrated in this figure may be implemented by set of tools 132 on end effector 120 after end effector 120 is precisely positioned relative to location 135 on work surface 116.

The process may begin by drilling hole 134 in work surface 116 of panel 112 using drilling system 140 in set of tools 132 (operation 2700). Thereafter, the process may inspect at least one of depth 155 or diameter 158 of hole 134 using inspection system 142 in set of tools 132 (operation 2702). For instance, hole probe 160 may be inserted into hole 134 to inspect hole 134.

The process then may insert fastener 104 into hole 134 using fastener installer 144 in set of tools 132 (operation 2704). In operation 2704, fastener management system 127 may assist fastener installer 144 by applying sealant 164 to fastener 104 and supplying fastener installer 144 with fastener 104 for insertion. The process may inspect fastener 104 (operation 2706) with the process terminating thereafter.

In this illustrative example, as set of tools 132 perform these operations, set of tools 132 may be moved along track system 147 in shuttle table 146 on end effector 120 to position each tool relative to hole 134. If additional adjustment is needed, at least one of second movement system 124 and motion platform 122 may be used. Further, tool management system 126 may exchange tools in set of tools 132 as needed.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 28:
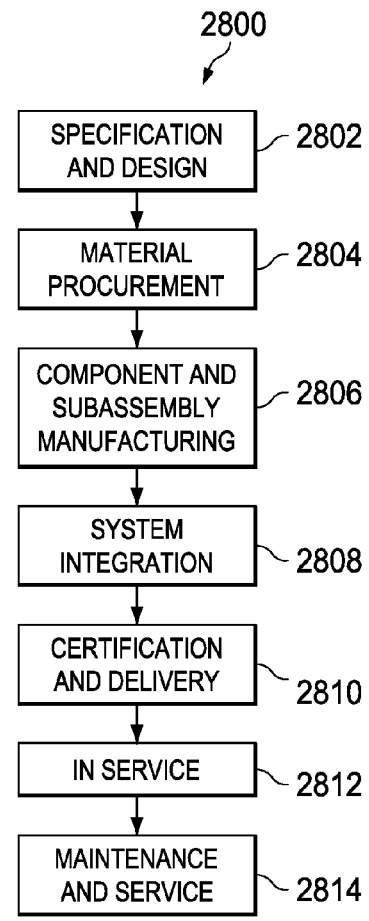
FIG. 28 is an illustration of an aircraft manufacturing and service method in the form of a block diagram in accordance with an illustrative embodiment.
Figure 29:
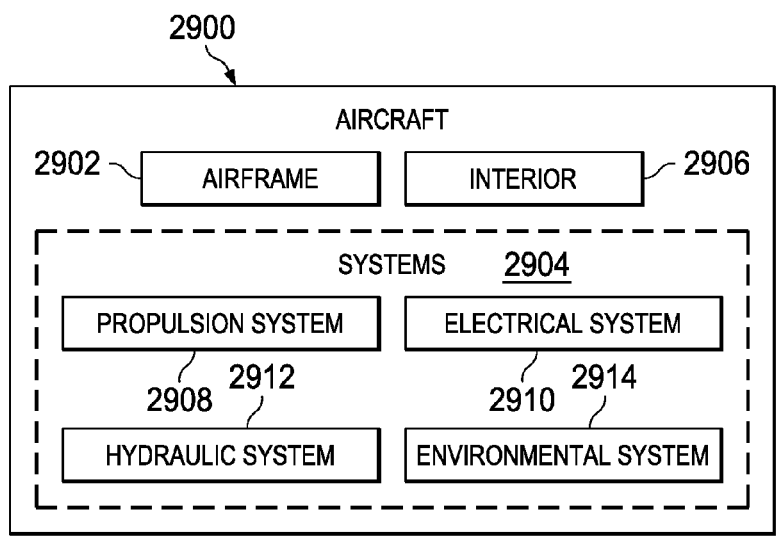
FIG. 29 is an illustration of an aircraft in the form of a block diagram in which an illustrative embodiment may be implemented.

Illustrative embodiments of the disclosure may be described in the context of aircraft manufacturing and service method 2800 as shown in FIG. 28 and aircraft 2900 as shown in FIG. 29. Turning first to FIG. 28, an illustration of an aircraft manufacturing and service method is depicted in the form of a block diagram in accordance with an illustrative embodiment. During pre-production, aircraft manufacturing and service method 2800 may include specification and design 2802 of aircraft 2900 in FIG. 29 and material procurement 2804.

During production, component and subassembly manufacturing 2806 and system integration 2808 of aircraft 2900 in FIG. 29 takes place. Thereafter, aircraft 2900 in FIG. 29 may go through certification and delivery 2810 in order to be placed in service 2812. While in service 2812 by a customer, aircraft 2900 in FIG. 29 is scheduled for routine maintenance and service 2814, which may include modification, reconfiguration, refurbishment, and other maintenance or service.

Each of the processes of aircraft manufacturing and service method 2800 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 29, an illustration of an aircraft is depicted in the form of a block diagram in which an illustrative embodiment may be implemented. In this example, aircraft 2900 is produced by aircraft manufacturing and service method 2800 in FIG. 28 and may include airframe 2902 with plurality of systems 2904 and interior 2906. Examples of systems 2904 include one or more of propulsion system 2908, electrical system 2910, hydraulic system 2912, and environmental system 2914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2800 in FIG. 28. In particular, overhead assembly system 102 from FIG. 1 may be used during various stages of aircraft manufacturing and service method 2800. For example, without limitation, location for holes in airframe 2902 may be determined during specification and design 2802. Further, overhead assembly system 102 may be used to install fastener 104 in airframe 2902 of aircraft 2900 during component and subassembly manufacturing 2806, system integration 2808, or both. In another illustrative example, overhead assembly system 102 may be used to perform drilling and inspection operations on airframe 2902 during routine maintenance and service 2814 or some other stage of aircraft manufacturing and service method 2800.

In one illustrative example, components or subassemblies produced in component and subassembly manufacturing 2806 in FIG. 28 may be fabricated or manufactured in a manner similar to components or subassemblies produced while aircraft 2900 is in service 2812 in FIG. 28. As yet another example, one or more apparatus embodiments, method embodiments, or a combination thereof may be utilized during production stages, such as component and subassembly manufacturing 2806 and system integration 2808 in FIG. 28. One or more apparatus embodiments, method embodiments, or a combination thereof may be utilized while aircraft 2900 is in service 2812, during maintenance and service 2814 in FIG. 28, or a combination thereof. The use of a number of the different illustrative embodiments may substantially expedite the assembly, reduce the cost of aircraft 2900, or both.

Thus, the illustrative embodiments may provide a method and apparatus for performing operation 111 on work surface 116 of structure 106. Operation 111 may be performed from above structure 106 using overhead assembly system 102. Overhead assembly system 102 may comprise motion platform 122 and overhead support system 118. Motion platform 122 may be configured to be positioned above work surface 116 of structure 106 to perform operation 111 on work surface 116. Overhead support system 118 may be configured to carry motion platform 122 across floor 107 of manufacturing environment 100 from first location 117 to second location 121.

With the use of overhead assembly system 102, operations may be performed from above work surface 116 without the need for manual drilling by human operators. The illustrative embodiments provide an autonomous, self-powered system that is capable of navigating throughout manufacturing environment 100 without human intervention. Under the coordinated control of system controller 166, overhead assembly system 102 may move from location to location, providing a flexible drilling and fastening system that can be used to manufacture various types of aircraft structures.

Even when used in conjunction with human operators, overhead assembly system 102 may reduce the number of assembly operations performed by the human operators. For instance, overhead assembly system 102 may use manually drilled holes in panel 112 as guides to install fasteners using fastener installer 144. In another illustrative example, overhead assembly system 102 may drill and inspect the holes, using drilling system 140 and inspection system 142, and human operators may install the fasteners.

In this manner, performing operations on work surface 116 may be done more efficiently and in less time than with some currently used systems. As a result, the time, cost, or both time and cost needed to manufacture aircraft 110 may be reduced.

The illustrative embodiments also provide an assembly system with alignment and positioning accuracy. Overhead support system 118 carrying motion platform 122 may be roughly positioned above work surface 116. Once above work surface 116, motion platform 122 precisely positions end effector 120 relative to location 135 on work surface 116. Due to the flexible design of motion platform 122 and end effector 120, end effector 120 moves with seven degrees of freedom to align set of tools 132 perpendicular to work surface 116. Sensor system 138 may continuously monitor the position of end effector 120. As a result, normality to work surface 116 may be achieved, increasing the consistency and alignment of holes drilled in work surface 116.

The various configurations for overhead support system 118, motion platform 122, and end effector 120 expand the work envelope for each assembly system such that one assembly can cover more volume than with some currently used systems. End effector 120 may be quickly repositioned using overhead track system 176, second movement system 124, and motion platform 122. Multiple end effectors may be carried by a single overhead support to further increase the speed of assembly of structure 106. Consequently, significant cost savings may be realized.

In addition, sensor system 138, inspection system 142, or both may be used to evaluate performance of overhead assembly system 102. For example, without limitation, sensor system 138 may measure the flushness of fastener 104 installed in panel 112. Subsequent installations may be modified based on this information to more accurately install fasteners. As another example, inspection system 142 may be used to ensure consistency between holes drilled in panel 112. Further, all of the operations performed by overhead assembly system 102 are completed without applying significant weight to structure 106. As a result, less rework may be needed to assemble structure 106 as desired, which further reduces manufacturing time for aircraft 110.

In this manner, a method for positioning a tool on a surface is provided. The tool is moved relative to the surface to roughly position the tool within a selected region on the surface using a first movement system. The tool is moved relative to the surface with at least one degree of freedom to precisely position the tool at a selected position within the selected region on the surface using a second movement system. An element associated with the tool for performing an operation at the selected position is aligned relative to the selected position using a third movement system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a motion platform configured to be positioned above a work surface of a structure to perform an operation on the work surface;
    an end effector on the motion platform, wherein the end effector comprises a shuttle table configured to move a set of tools along a track system in the shuttle table;
    an overhead support system configured to carry the motion platform across a floor of a manufacturing environment from a first location to a second location;
    a movement system associated with the overhead support system, wherein the movement system is configured to move the overhead support system from the first location to the second location; and
    an overhead track system having tracks overhead of the structure, wherein the overhead track system is secured to the overhead support system and is configured to move the motion platform along a longitudinal axis of the overhead support system.

2. The apparatus of claim 1 wherein the end effector is configured to hold the set of tools and perform the operation using the set of tools.

3. The apparatus of claim 2, wherein the motion platform is configured to position the set of tools perpendicular to a location on the work surface to perform the operation.

4. The apparatus of claim 2, wherein the set of tools further comprises:
    a sensor system configured to identify at least one of the work surface, a position of the end effector relative to the work surface, or a location on the work surface to drill a hole for a fastener.

5. The apparatus of claim 4, wherein the sensor system is configured to identify the position of the end effector based on index features on the work surface.

6. The apparatus of claim 2 further comprising:
    a pressure foot connected to the end effector and configured to identify a contact force between the pressure foot and the work surface and apply a desired contact force to the work surface.

7. The apparatus of claim 2, wherein the set of tools further comprises:
    a drilling system configured to drill a hole in the work surface.

8. The apparatus of claim 7, wherein the drilling system comprises a spindle and a feed axis.

9. The apparatus of claim 7, wherein the set of tools further comprises:
    an inspection system having a hole probe configured to inspect the hole drilled in the work surface.

10. The apparatus of claim 7, wherein the set of tools further comprises:
    a fastener installer configured to insert a fastener into the hole drilled in the work surface.

11. The apparatus of claim 10 further comprising:
    a fastener management system configured to hold fasteners, apply a sealant to the fastener, and supply the fastener to the fastener installer.

12. The apparatus of claim 2 further comprising:
    a tool management system configured to exchange a tool between a storage rack and the end effector.

13. The apparatus of claim 1, wherein the movement system is configured to drive the overhead support system carrying the motion platform from the first location to the second location.

14. The apparatus of claim 1, wherein the movement system is a first movement system and further comprising:
    a second movement system associated with the motion platform and configured to move the motion platform along a vertical axis toward the work surface.

15. The apparatus of claim 1, wherein the movement system comprises mecanum wheels.

16. The apparatus of claim 1, wherein the movement system is configured to move the overhead support system carrying the motion platform back and forth along a length of the structure to perform the operation on the work surface.

17. The apparatus of claim 1 further comprising:
a number of additional motion platforms moveably connected to the overhead support system and configured to move along the overhead track system.

18. The apparatus of claim 17, wherein the number of additional motion platforms simultaneously perform the operation on the work surface.

19. The apparatus of claim 1 further comprising:
a power supply system configured to supply power to the apparatus.

20. The apparatus of claim 1, wherein the overhead support system is mounted to a ceiling of the manufacturing environment.

21. The apparatus of claim 1, wherein the overhead support system is a gantry system having a gantry beam and vertical support structures.

22. The apparatus of claim 1, wherein the motion platform is a hexapod.

23. The apparatus of claim 1 further comprising:
a controller configured to receive commands from a system controller in the manufacturing environment, wherein the commands include at least one of a path from the first location to the second location or the operation to be completed by the overhead support system and the motion platform.

24. The apparatus of claim 1, wherein the structure is incorporated in at least one of a wing, a fuselage, a horizontal stabilizer, a door, a panel, a housing, and an engine.

25. The apparatus of claim 1, wherein the operation is selected from one of a drilling operation, a fastening operation, an inspection operation, a measurement operation, a cleaning operation, a sealing operation, and a data collection operation.

26. The apparatus of claim 1, wherein steering direction for the overhead support system to steer from the first location to the second location is provided by at least one of a human operator, a controller associated with the overhead support system, or a system controller.

27. The apparatus of claim 1, wherein the overhead support system is configured to steer itself.

28. A method comprising:
carrying a motion platform across a floor of a manufacturing environment from a first location to a second location using an overhead support system;
positioning the motion platform above a work surface of a structure to perform an operation on the work surface;
positioning an end effector relative to a location on the work surface using the motion platform, wherein the end effector comprises a shuttle table configured to move a set of tools along a track system in the shuttle table;
moving the overhead support system from the first location to the second location using a movement system; and
moving the motion platform along a longitudinal axis of the overhead support system using an overhead track system secured to the overhead support system, wherein the overhead track system is overhead of the structure.

29. The method of claim 28, wherein the end effector is further configured to hold the set of tools and perform the operation on the work surface using the set of tools.

30. The method of claim 29 further comprising:
performing the operation on the work surface using the set of tools.

31. The method of claim 29 further comprising:
installing a fastener in the work surface using the set of tools.

32. The method of claim 29 further comprising:
drilling a hole in the work surface using a drilling system in the set of tools.

33. The method of claim 32 further comprising:
inspecting at least one of a depth or a diameter of the hole using an inspection system in the set of tools.

34. The method of claim 33 further comprising:
inserting a fastener into the hole using a fastener installer in the set of tools.

35. The method of claim 34 further comprising:
applying a sealant to the fastener using a fastener management system; and
receiving the fastener from the fastener management system using the fastener installer, wherein the fastener is received prior to inserting the fastener with the sealant into the hole.

36. The method of claim 28, further comprising:
driving the overhead support system across the floor of the manufacturing environment from the first location to the second location.

37. The method of claim 28, wherein the movement system is a first movement system and further comprising:
moving the motion platform along a vertical axis toward the work surface using a second movement system.

38. The method of claim 28, further comprising:
moving the overhead support system carrying the motion platform back and forth along a length of the structure to perform the operation on the work surface.

39. The method of claim 28, further comprising:
moving a number of additional motion platforms along the overhead track system to simultaneously perform the operation on the work surface.

40. The method of claim 28 further comprising:
identifying a contact force between a pressure foot connected to an end effector and the work surface; and
applying a desired contact force to the work surface.

41. The method of claim 28 further comprising:
moving the motion platform along a vertical axis toward the work surface.

42. The method of claim 28 further comprising:
receiving commands from a system controller in the manufacturing environment, wherein the commands include at least one of a path from the first location to the second location or the operation to be completed by the overhead support system and the motion platform.

43. The method of claim 28 further comprising:
steering the overhead support system from the first location to the second location.

44. The method of claim 43 further comprising:
providing steering direction for the overhead support system.

45. The method of claim 44, wherein the steering direction is provided by at least one of a human operator, a controller associated with the overhead support system, or a system controller.

* * * * *